(12) United States Patent
Wu et al.

(10) Patent No.: US 11,758,531 B2
(45) Date of Patent: Sep. 12, 2023

(54) METHOD AND DEVICE IN NODE USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/864,438

(22) Filed: Jul. 14, 2022

(65) Prior Publication Data
US 2022/0353911 A1 Nov. 3, 2022

Related U.S. Application Data

(63) Continuation of application No. 16/869,614, filed on May 8, 2020, now Pat. No. 11,452,117.

(30) Foreign Application Priority Data

May 9, 2019 (CN) .......................... 201910383877.6
May 15, 2019 (CN) .......................... 201910402690.6

(51) Int. Cl.
*H04W 72/02* (2009.01)
*H04W 72/12* (2023.01)
*H04B 7/06* (2006.01)
*H04W 74/08* (2009.01)
*H04W 72/566* (2023.01)
*H04W 72/0453* (2023.01)
*H04W 72/0446* (2023.01)

(52) U.S. Cl.
CPC .......... *H04W 72/12* (2013.01); *H04B 7/0626* (2013.01); *H04W 72/02* (2013.01); *H04W 72/569* (2023.01); *H04W 74/0808* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 11,452,117 B2* | 9/2022 | Wu | H04W 74/0808 |
| 2021/0219320 A1* | 7/2021 | Belleschi | H04W 76/14 |
| 2021/0345364 A1* | 11/2021 | Zhang | H04L 1/0026 |

* cited by examiner

*Primary Examiner* — The Hy Nguyen

(57) ABSTRACT

The present disclosure provides a method and device in a communication node used for wireless communication. A communication node performs signaling monitoring in a first time window, and X1 signaling(s) is(are) detected in the signaling monitoring process; determines a first resource set from a first candidate resource pool; transmits a first signaling; and transmits a first radio signal in the first resource set. The X1 signaling(s) and X1 target parameter(s) are used to determine Y1 candidate resource set(s) from the first candidate resource pool; the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling.

18 Claims, 13 Drawing Sheets when first radio signal only carries first control information target priority index —being equal to→ first priority index when first radio signal only carries information other than first control information target priority index —being equal to→ second priority index

FIG. 8

When first radio signal carries first control information and information other than first control information Target priority index $\xrightarrow{\text{being equal to}}$ second priority index Or target priority index $\xrightarrow{\text{being equal to}}$ a smaller one between first priority index and second priority index Or target priority index $\xrightarrow{\text{being equal to}}$ a greater one between first priority index and second priority index

FIG. 9

METHOD AND DEVICE IN NODE USED FOR WIRELESS COMMUNICATION

CROSS REFERENCE TO RELATED APPLICATIONS

This application is the continuation of the U.S. patent application Ser. No. 16/869,614, filed on May 8,2020, which claims the priority benefit of Chinese Patent Application No. CN201910383877.6 filed on May 9, 2019, and the benefit of Chinese Application No. CN201910402690.6 filed on May 15, 2019. The full disclosure of which are incorporated herein by reference.

BACKGROUND

Technical Field

The present disclosure relates to a transmission method and device in a wireless communication system, and in particular to a transmission scheme and device of a sidelink in wireless communication.

Related Art

The application scenarios of wireless communication systems will become increasingly diverse in the future, and different application scenarios pose different performance requirements on the systems. In order to meet the different performance requirements of various application scenarios, the research on New Radio (NR), or what is called Fifth Generation (5G), is decided to be conducted at the 3rd Generation Partner Project (3GPP) Radio Access Network (RAN) #72 plenary meeting, and the Work Item (WI) of NR was approved at the 3GPP RAN #75 plenary meeting to standardize NR.

In response to the rapid growing Vehicle-to-Everything (V2X) traffic, the 3GPP has also started standard formulation and research work under the NR framework. At present, 3GPP has completed the planning for 5G V2X traffic and included it into the standard TS22.886. 3GPP, identifying and defining 4 Use Case Groups for 5G V2X, including Vehicles Platooning, Extended Sensors, Advanced Driving and Remote Driving. At the 3GPP RAN #80 plenary session, a Study Item (SI) of techniques of NR V2X was approved.

SUMMARY

Compared with the existing Long-term Evolution (LTE) V2X system, NR V2X has a notable feature in supporting groupcast and unicast as well as Hybrid Automatic Repeat Request (HARQ) feedback and Channel Status Information (CSI) feedback. In addition, NR V2X supports a UE to choose independently the mode of transmitting resources and a corresponding mechanism to avoid or reduce collisions. The design of CSI and/or HARQ feedback needs to be figured out.

In view of the above problem, the present disclosure provides a solution. It should be noted that embodiments and characteristics of the embodiments of a UE in the present disclosure may be applied to a base station if no conflict is incurred, and vice versa. Embodiments and characteristics of embodiments in the present disclosure may be mutually combined if no conflict is incurred.

The present disclosure provides a method in a first communication node for wireless communication, comprising:

performing signaling monitoring in a first time window, and X1 signaling(s) is(are) detected in the signaling monitoring process, X1 being a non-negative integer;

determining a first resource set among a first candidate resource pool;

transmitting a first signaling; and transmitting a first radio signal in the first resource set;

herein, the X1 signaling(s) and X1 target parameter(s) are used to determine Y1 candidate resource set(s) from the first candidate resource pool, and Y1 is a non-negative integer; the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling; whether the first radio signal carries first control information is used to determine the X1 target parameter(s).

In one embodiment, a problem needed to be solved in the present disclosure is: under the V2X mode where a UE selects transmission resources independently, how to avoid or reduce the collision during the transmission of sidelink feedback information (e.g., CSI, HARQ) by signaling monitoring, so as to improve transmission efficiency of feedback information, and improve the throughput capacity and system capacity of data transmission.

In one embodiment, the essence of the above method is that X1 signaling(s) is(are) X1 piece(s) of sidelink control information (SCI), and first control information is feedback information (e.g., CSI and HARQ). X1 target parameter(s) is(are) threshold(s) of signaling monitoring, and the threshold(s) of the signaling monitoring is(are) used to exclude Y1 candidate resource set(s) among a first candidate resource pool. A first communication node selects a candidate resource set from remaining candidate resource set(s) among a first candidate resource pool to transmit a first radio signal, and the selected candidate resource set is a first resource set; threshold(s) of signaling monitoring is(are) related to whether a first radio signal carries feedback information. The advantage of adopting the above method is that when a UE selects transmission resources independently, a reasonable design of threshold(s) of the signaling monitoring can effectively avoid or reduce sidelink feedback information, so as to improve transmission efficiency of feedback information, and further improve throughput capacity and system capacity of data transmission.

According to one aspect of the present disclosure, the above method is characterized in comprising:

receiving a second signaling; and receiving a second radio signal;

wherein the second signaling is used to determine time-frequency resources occupied by the second radio signal, and the first control information is related to the second radio signal.

According to one aspect of the present disclosure, the above method is characterized in that the X1 is greater than 0, the X1 signaling(s) respectively corresponds(correspond) to X1 measured value(s), the X1 signaling(s) is(are) used to determine Y0 candidate resource set(s) among the first candidate resource pool, and Y0 is a non-negative integer not less than the Y1; when the Y0 is greater than 0, the X1 measured value(s) respectively corresponds(correspond) to the X1 target parameter(s), and relative magnitude of each of the X1 measured value(s) and the corresponding target parameter in the X1 target parameter(s) is used to determine the Y1 candidate resource set(s) from the Y0 candidate resource set(s); when the Y1 is greater than 0, any of the Y1 candidate resource set(s) is one of the Y0 candidate resource set(s).

According to one aspect of the present disclosure, the above method is characterized in that a priority of the first radio signal corresponds to a target priority index, and the target priority index is used to determine the X1 target parameter(s); when the first radio signal only carries the first control information, the target priority index is equal to a first priority index; when the first radio signal only carries information other than the first control information, the target priority index is equal to a second priority index.

In one embodiment, the essence of the above method is that X1 target parameter(s) is(are) threshold(s) of signaling monitoring, the threshold(s) of signaling monitoring is(are) related to a priority of a first radio signal, and a priority of a first radio signal is related to whether a first radio signal carries feedback information.

According to one aspect of the present disclosure, the method is characterized in that when the first radio signal carries the first control information and information other than the first control information, the target priority index is equal to the second priority index; or the target priority index is equal to a smaller one between the first priority index and the second priority index; or, the target priority index is equal to a greater one between the first priority index and the second priority index.

According to one aspect of the present disclosure, the method is characterized in that the first control information is related to a second radio signal, a second signaling is used to determine time-frequency resources occupied by the second radio signal, and the second signaling is used to indicate the first priority index; or, the first signaling is used to indicate the first priority index; or, the first priority index is not equal to the second priority index.

According to one aspect of the present disclosure, the method is characterized in that the first candidate resource pool comprises Y candidate resource sets; when the Y1 is greater than 0, any candidate resource set of the Y1 candidate resource set(s) is one candidate resource set of the Y candidate resource sets; the first resource set is a candidate resource set among Y2 candidate resource set(s), and any of the Y2 candidate resource set(s) is a candidate resource set among the Y candidate resource sets other than the Y1 candidate resource set(s); Y2 is a positive integer, and Y is a positive integer not less than a sum of the Y1 and the Y2; a ratio of the Y2 to the Y is not less than a first threshold.

In one embodiment, the essence of the above method is that a first communication node firstly selects Y2 candidate resource set(s) from the remaining candidate resource set(s) among the first candidate resource pool, which satisfies a condition that a ratio of Y2 to Y is not less than a first threshold; then a first communication node selects a first resource set from Y2 candidate resource set(s).

The present disclosure provides a method in a second communication node for wireless communication, comprising:

performing signaling monitoring in a first candidate resource pool;

receiving a first signaling; and receiving a first radio signal in a first resource set;

herein, X1 target parameter(s) is(are) used by a communication node transmitting the first signaling to determine Y1 candidate resource set(s) from the first candidate resource pool, X1 being a non-negative integer and Y1 being a non-negative integer; the first resource set is a candidate resource set in the first candidate resource pool other than the Y1 candidate resource set(s); the first signaling is used to determine time-frequency resources occupied by the first radio signal; whether the first radio signal carries first control information is used by the communication node transmitting the first signaling to determine the X1 target parameter(s).

According to one aspect of the present disclosure, the above method is characterized in comprising:

transmitting a second signaling; and transmitting a second radio signal;

herein, the second signaling is used to determine time-frequency resources occupied by the second radio signal, and the first control information is related to the second radio signal.

The present disclosure provides a first communication node for wireless communication, comprising:

a first receiver, performing signaling monitoring in a first time window. X1 signaling(s) is(are) detected in the signaling monitoring process, X1 being a non-negative integer;

a first processor, determining a first resource set from a first candidate resource pool; and a first transmitter, transmitting a first signaling; transmitting a first radio signal in the first resource set;

herein the X1 signaling(s) and X1 target parameter(s) are used to determine Y1 candidate resource set(s) from the first candidate resource pool, and Y1 is a non-negative integer; the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling; whether the first radio signal carries first control information is used to determine the X1 target parameter(s).

The present disclosure provides a second communication node for wireless communication, comprising:

a second receiver, performing signaling monitoring in a first candidate resource pool; receiving a first signaling; and receiving a first signaling in a first resource set;

herein X1 target parameter(s) is(are) used by a communication node transmitting the first signaling to determine Y1 candidate resource set(s) from the first candidate resource pool, X1 being a non-negative integer and Y1 being a non-negative integer; the first resource set is a candidate resource set in the first candidate resource pool other than the Y1 candidate resource set(s); the first signaling is used to determine time frequency resources occupied by the first radio signal; whether the first radio signal carries first control information is used by the communication node transmitting the first signaling to determine the X1 target parameter(s).

In one embodiment, the method in the present disclosure is advantageous in the following aspects:

under V2X mode where a UE selects transmission resources independently, the present disclosure proposes a signaling monitoring method to avoid or reduce the occurrence of sidelink collision for transmission of sidelink feedback information (e.g., CSI, HARQ), so as to improve the transmission efficiency of feedback information, and further improve the throughput capacity and system capacity of data transmission.

when the UE selects transmission resources independently, method proposed in the present disclosure can effectively avoid or reduce the occurrence of the sidelink collision by reasonably designing a threshold of signaling monitoring.

when the UE independently selects transmission resources, a threshold of signaling monitoring is related to a priority corresponding to radio signals to be transmitted. The method proposed in the present disclosure can effectively avoid or reduce occurrence of sidelink collision by reasonably designing a priority of sidelink feedback information.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of determining a target priority index according to one embodiment of the present disclosure;

FIG. 9 illustrates a schematic diagram of determining a target priority index according to another embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
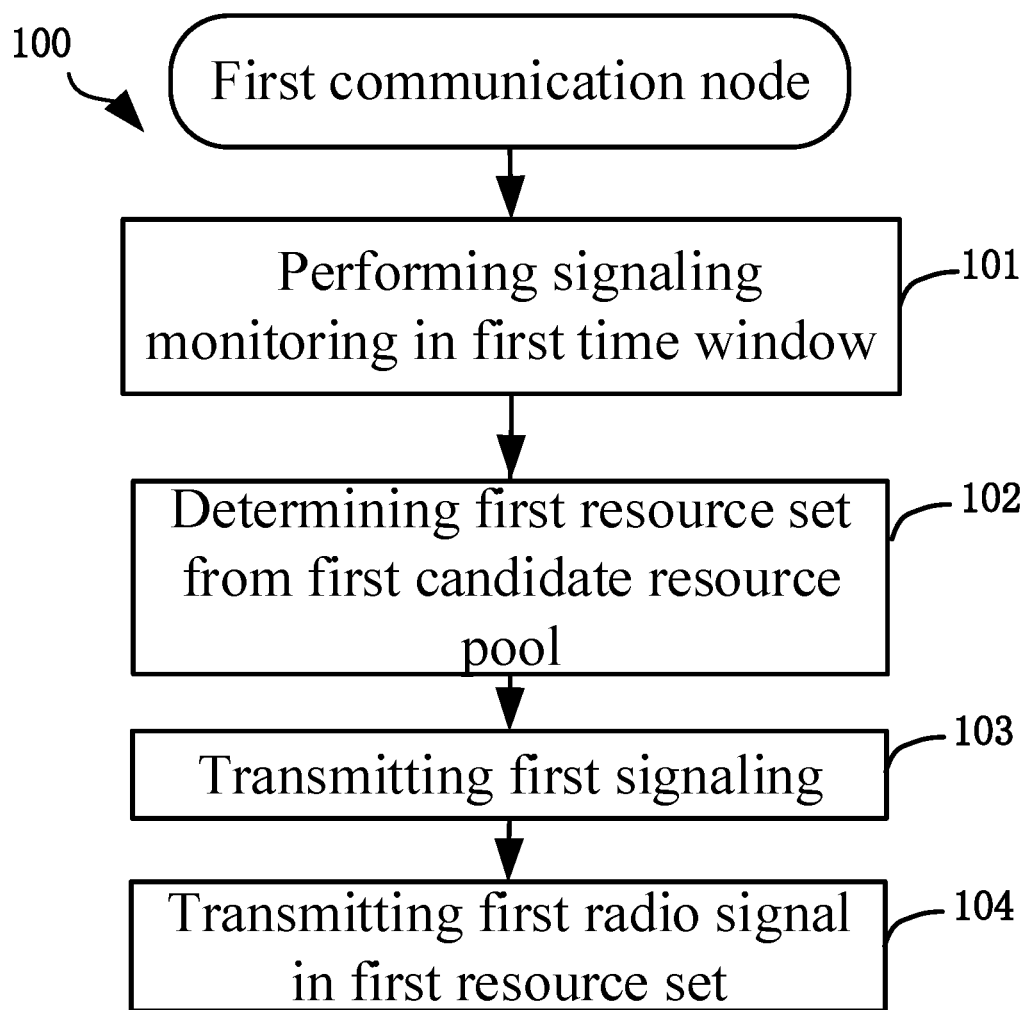
FIG. 1 illustrates a flow chart of X1 signaling(s), Y1 candidate resource set(s), a first signaling, and a first radio signal according to one embodiment of the present disclosure.

Embodiment 1 illustrates a flow chart of X1 signaling(s), Y1 candidate resource set(s), a first signaling and a first radio signal according to one embodiment of the present disclosure, as shown in FIG. 1. In FIG. 1, each box represents a step, and it is particularly emphasized that the order of boxes in the diagram does not represent chronological relationship between steps presented.

In Embodiment 1, a first communication node in the present disclosure performs signaling monitoring in a first time window in step S101, X1 signaling(s) being detected during signaling monitoring process and X1 being a non-negative integer; determines a first resource set from a first candidate resource pool in step S102; transmits a first signaling in step S103; and transmits a first radio signal in the first resource set in step S104; wherein the X1 signaling (s) and X1 target parameter(s) are used to determine Y1 candidate resource set(s) from the first candidate resource pool, Y1 being a non-negative integer; the first resource set is a candidate resource set in the first candidate resource pool other than the Y1 candidate resource set(s); the first signaling is used to determine time frequency resources occupied by the first radio signal; an end time of the first time window is not later than a start time for transmission of the first signaling; whether the first radio signal carries first control information is used to determine the X1 target parameter(s).

In one embodiment, the first communication node is a UE.

In one embodiment, the first communication node is a vehicle-mounted communication device.

In one embodiment, the first communication node is a UE supporting V2X communications.

In one embodiment, the first communication node can only support Half Duplex.

In one embodiment, the first communication node can only receive or transmit at any time.

In one embodiment, the signaling monitoring on time-domain resources used for transmission in the first time window is not performed.

In one embodiment, the signaling monitoring on time-domain resources occupied by transmission in the first time window is not performed.

In one embodiment, the first time window comprises a positive integer number of multicarrier symbol(s).

In one embodiment, the first time window comprises a positive integer number of consecutive multi-carrier symbols.

In one embodiment, the first time window comprises M time-domain resource units, and the signaling monitoring is performed in each of the M time-domain resource units, M being a positive integer.

In one subembodiment of the above embodiment, any two of the M time-domain resource units are orthogonal.

In one subembodiment of the above embodiment, the M time-domain resource units are contiguous.

In one subembodiment of the above embodiment, there are two of the M time-domain resource units being discontinuous.

In one embodiment, the time-frequency resource unit comprises a sub-frame.

In one embodiment, the time-frequency resource unit comprises a slot.

In one embodiment, the time-frequency resource unit comprises a mini-slot.

In one embodiment, the time-frequency resource unit comprises a positive integer number of consecutive multi-carrier symbols.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the signaling monitoring is realized by a Decoding of a signaling.

In one embodiment, the signaling monitoring is realized by a Sensing of a signaling.

In one embodiment, the signaling monitoring is realized by a Decoding and a CRC Check of a signaling.

In one embodiment, the signaling monitoring is realized by an energy Detecting and a Decoding of a signaling.

In one embodiment, the signaling monitoring comprises a Decoding of Sidelink Control Information (SCI).

In one embodiment, the signaling monitoring comprises a Sensing of Sidelink Control Information (SCI).

In one embodiment, the signaling monitoring comprises a Decoding of SCI transmitted by a communication node other than the first communication node.

In one embodiment, the signaling monitoring comprises a Sensing of SCI transmitted by a communication node other than the first communication node.

In one embodiment, the signaling monitoring comprises all candidate Blind Decodings for SCI transmission in the first time window.

In one embodiment, the signaling monitoring comprises all candidate Blind Decodings for SCI transmission other than time-domain resources transmitted by the first communication node in the first time window.

In one embodiment, the signaling monitoring comprises a Blind Decoding for given SCI format(s) in all candidate time-frequency resources which may transmit SCI in the first time window.

In one embodiment, the signaling monitoring comprises a Blind Decoding for given SCI format(s) in all candidate time-frequency resources which may transmit SCI other than time-domain resources transmitted by the first communication node in the first time window.

In one embodiment, the X1 is equal to 0.

In one embodiment, the X1 is greater than 0.

In one embodiment, only the X1 signaling(s) is(are) detected in the signaling monitoring.

In one embodiment, there is(are) signaling(s) other than the X1 signaling(s) being detected during the signaling monitoring.

In one embodiment, any of the X1 signaling(s) passes the Cyclic Redundancy Check (CRC) after channel decoding.

In one embodiment, the X1 signaling(s) is(are) used by the first communication node in the present disclosure to determine the Y1 candidate resource set(s).

In one embodiment, the X1 signaling(s) is(are) used to directly indicate the Y1 candidate resource set(s).

In one embodiment, the X1 signaling(s) is(are) used to indirectly indicate the Y1 candidate resource set(s).

In one embodiment, the X1 signaling(s) is(are) used to explicitly indicate the Y1 candidate resource set(s).

In one embodiment, the X1 signaling(s) is(are) used to implicitly indicate the Y1 candidate resource set(s).

In one embodiment, the X1 signaling(s) is(are) used to determine Y0 candidate resource set(s), Y0 being a non-negative integer not less than the Y1; when the Y0 is greater than 0, any of the Y0 candidate resource set(s) is a candidate resource set among the first candidate resource pool; when the Y1 is greater than 1, any of the Y1 candidate resource sets is one of the Y0 candidate resource set(s).

In one subembodiment of the above embodiment, any of the X1 signaling(s) is used for the determination of at least one of the Y0 candidate resource set(s).

In one subembodiment of the above embodiment, the determination of any of the Y0 candidate resource set(s) is by one of the X1 signaling(s).

In one subembodiment of the above embodiment, the meaning of the word "determine" includes a direct indication.

In one subembodiment of the above embodiment, the meaning of the word "determine" includes an indirect indication.

In one subembodiment of the above embodiment, the meaning of the word "determine" includes an explicit indication.

In one subembodiment of the above embodiment, the meaning of the word "determine" includes an implicit indication.

In one subembodiment of the above embodiment, the meaning of the word "determine" includes a reservation.

In one subembodiment of the above embodiment, the meaning of the word "determine" includes an indication or reservation.

In one embodiment, the X1 signaling (s) is(are) also used by the first communication node in the present disclosure to determine candidate resource set(s) other than the Y1 candidate resource set(s).

In one embodiment, the X1 signaling(s) is(are) also used by the first communication node in the present disclosure to determine a candidate resource set among the first candidate resource pool other than the Y1 candidate resource set(s).

In one embodiment, the X1 signaling(s) is(are) also used by the first communication node in the present disclosure to determine a candidate resource set other than the first candidate resource pool.

In one embodiment, any of the X1 signaling(s) is a physical layer signaling.

In one embodiment, any of the X1 signaling(s) is Broadcast.

In one embodiment, any of the X1 signaling(s) is Groupcast.

In one embodiment, any of the X1 signaling(s) is Unicast.

In one embodiment, one of the X1 signaling(s) is Broadcast, or Multicast or Unicast.

In one embodiment, any of the X1 signaling(s) is transmitted through a Sidelink.

In one embodiment, any of the X1 signaling(s) carries Sidelink Control Information (SCI).

In one embodiment, any of the X1 signaling(s) carries part or all of Fields of Sidelink Control Information (SCI).

In one embodiment, any of the X1 signaling(s) is transmitted through a Physical Sidelink Control Channel (PSCCH).

In one embodiment, when the X1 is equal to 0, the Y1 is equal to 0.

In one embodiment, when the Y1 is greater than 0, any of the Y1 candidate resource set(s) belongs to the first candidate resource pool.

In one embodiment, the first candidate resource pool comprises Y candidate resource sets, and the Y is a positive integer greater than the Y1;

In one subembodiment of the above embodiment, when the Y1 is greater than 0, any of the Y1 candidate resource set(s) is a candidate resource set among the Y candidate resource sets.

In one subembodiment of the above embodiment, any of the Y candidate resource sets comprises at least one of time-frequency resources or code-domain resources.

In one subembodiment of the above embodiment, any of the Y candidate resource sets is reserved for transmission of a Physical Sidelink Shared Channel (PSSCH).

In one subembodiment of the above embodiment, any of the Y candidate resource sets is reserved for transmission of PSSCH and PSCCH.

In one subembodiment of the above embodiment, the Y is greater than 1, and time-frequency resources or code-domain resources comprised in any two of the Y candidate resource sets are orthogonal.

In one subembodiment of the above embodiment, the Y is greater than 1, and time-frequency resources comprised in any two candidate resource sets of the Y candidate resource sets are orthogonal.

In one subembodiment of the above embodiment, the Y is greater than 1, and time-frequency resources comprised in any two of the Y candidate resource sets are different.

In one subembodiment of the above embodiment, the Y is greater than 1, and there are time-frequency resources comprised in two of the Y candidate resource sets being not orthogonal.

In one subembodiment of the above embodiment, the Y is greater than 1, there are time-frequency resources comprised in two of the Y candidate resource sets being partially or completely overlapping.

In one subembodiment of the above embodiment, the Y is greater than 1, there are same time-frequency resources and different code-domain resources comprised in two of the Y candidate resource sets.

In one embodiment, the first resource set is not one of the Y1 candidate resource set(s).

In one embodiment, the first candidate resource pool comprises Y candidate resource sets, and the Y is a positive integer greater than the Y1; the first resource set is a candidate resource set among the Y candidate resource sets other than the Y1 candidate resource set(s).

In one subembodiment of the above embodiment, Y-Y1 candidate resource set(s) is(are) comprised of all candidate resource set(s) among the Y candidate resource sets other than Y1 candidate resource set(s), and the first resource set is a candidate resource set among the Y-Y1 candidate resource set(s).

In one embodiment, the first signaling is a physical layer signaling.

In one embodiment, the first signaling is Broadcast.

In one embodiment, the first signaling is Groupcast.

In one embodiment, the first signaling is Unicast.

In one embodiment, the first signaling is transmitted through a Sidelink.

In one embodiment, the first signaling carries Sidelink Control Information (SCI).

In one embodiment, the first signaling comprises part or all of Fields of Sidelink Control Information (SCI).

In one embodiment, the first signaling is transmitted through a Physical Sidelink Control Channel (PSCCH).

In one embodiment, a target receiver of the first signaling is the second communication node in the present disclosure.

In one embodiment, the first signaling directly indicates time-frequency resources occupied by the first radio signal.

In one embodiment, the first signaling indirectly indicates time-frequency resources occupied by the first radio signal.

In one embodiment, the first signaling explicitly indicates time-frequency resources occupied by the first radio signal.

In one embodiment, the first signaling implicitly indicates time-frequency resources occupied by the first radio signal.

In one embodiment, the first signaling is used to indicate the first resource set from the first candidate resource pool.

In one embodiment, time-frequency resources occupied by the first signaling are used to determine time-frequency resources occupied by the first radio signal.

In one embodiment, time-frequency resources occupied by the first signaling are related to time-frequency resources occupied by the first radio signal, and time-frequency resources occupied by the first radio signal can be inferred according to time-frequency resources occupied by the first signaling.

In one embodiment, time-domain resources occupied by the first signaling are used to determine time-domain resources occupied by the first radio signal.

In one embodiment, time-domain resources occupied by the first signaling are related to time-domain resources occupied by the first radio signal, and time-domain resources occupied by the first radio signal can be inferred according to time-domain resources occupied by the first signaling; the first signaling indicates frequency-domain resources occupied by the first radio signal.

In one embodiment, frequency-domain resources occupied by the first signaling are used to determine frequency-domain resources occupied by the first radio signal.

In one embodiment, frequency-domain resources occupied by the first signaling are related to frequency-domain resources occupied by the first radio signal, and frequency-domain resources occupied by the first radio signal can be inferred according to frequency-domain resources occupied by the first signaling; the first signaling indicates time-domain resources occupied by the first radio signal.

In one embodiment, the first signaling also indicates at least one of a Modulation Coding Scheme (MCS) adopted by the first radio signal or a Redundancy Version (RV) adopted by the first radio signal.

In one embodiment, the first signaling also indicates a redundant version adopted by the first radio signal.

In one embodiment, the first signaling also indicates an MCS adopted by the first radio signal.

In one embodiment, the first radio signal is transmitted through a Sidelink Shared Channel (SL-SCH).

In one embodiment, the first radio signal is transmitted through a Sidelink.

In one embodiment, the first radio signal is transmitted through a PC5 interface.

In one embodiment, the first radio signal is Unicast.

In one embodiment, the first radio signal is Groupcast.

In one embodiment, the first radio signal is Broadcast.

In one embodiment, the first radio signal is transmitted through a Physical Sidelink Shared Channel (PSSCH).

In one embodiment, an end time of the first time window is earlier than a start time for transmission of the first signaling.

In one embodiment, an end time of the first time window is a start time for transmission of the first signaling.

In one embodiment, the first time window comprises M time-domain resource units. A first time-domain resource unit is a latest time-domain resource unit in the first time window, and a second time-domain resource unit is a time-domain resource unit comprising time-domain resources occupied by the first signaling.

In one subembodiment of the above embodiment, any two of the M time-domain resource units are orthogonal.

In one subembodiment of the above embodiment, an end time of the first time-domain resource unit is earlier than a start time of the second time-domain resource unit.

In one subembodiment of the above embodiment, the first time-domain resource unit is the same as the second time-domain resource unit.

In one embodiment, an end time of the first time window is earlier than a determination time of the first resource set.

In one embodiment, an end time of the first time window is a determination time of the first resource set.

In one embodiment, the determination time of the first resource set is used to determine the first time window.

In one embodiment, the first time window comprises M time-domain resource units; a first time-domain resource unit is a latest time-domain resource unit in the first time window; a third time-domain resource unit is a time-domain resource unit comprising a determination time of the first resource set.

In one subembodiment of the above embodiment, any two of the M time-domain resource units are orthogonal, the M time-domain resource units being continuous.

In one subembodiment of the above embodiment, the third time-domain resource unit is used to determine the M time-domain resource units.

In one subembodiment of the above embodiment, the first time-domain resource unit is a time-domain resource unit with a first time offset earlier than the third time-domain resource unit, the first time offset being predefined or configurable.

In one subembodiment of the above embodiment, a first time offset is a difference subtracting an index the first time-domain resource unit from an index of the third first time-domain resource unit, the first time offset being predefined or configurable.

In one subembodiment of the above embodiment, an end time of the first time-domain resource unit is earlier than a start time of the third time-domain resource unit.

In one subembodiment of the above embodiment, the first time-domain resource unit is the same as the third time-domain resource unit.

In one embodiment, the determination time of the first resource set is earlier than a start time for transmission of the first signaling.

In one embodiment, a determination time of the first resource set is a start time for transmission time of the first signaling.

In one embodiment, a second time-domain resource unit is a time-domain resource unit comprising time-domain resources occupied by the first signaling, and a third time-domain resource unit is a time-domain resource unit comprising a determination time of the first resource set.

In one subembodiment of the above embodiment, an end time of the third time-domain resource unit is earlier than a start time of the second time-domain resource unit.

In one subembodiment of the above embodiment, the third time-domain resource unit is the same as the second time-domain resource unit.

In one embodiment, a second time-domain resource unit is a time-domain resource unit comprising time-domain resources occupied by the first signaling, and a fourth time-domain resource unit is a time-domain resource unit comprising time-domain resources occupied by the first resource set.

In one subembodiment of the above embodiment, an end time of the second time-domain resource unit is earlier than a start time of the fourth time-domain resource unit.

In one subembodiment of the above embodiment, the fourth time-domain resource unit is the same as the second time-domain resource unit.

In one embodiment, a start time of the first candidate resource pool is later than a determination time of the first resource set.

In one embodiment, a determination time of the first resource set is used to determine the first candidate resource pool.

In one embodiment, a third time-domain resource unit is a time-domain resource unit comprising a determination time of the first resource set, and the third time-domain resource unit is used to determine N time-domain resource units. The N time-domain resource units comprise time-domain resources occupied by the first candidate resource pool, N being a positive integer.

In one subembodiment of the above embodiment, any two of the N time-domain resource units are orthogonal, and the N time-domain resource units are continuous.

In one subembodiment of the above embodiment, an earliest time-domain resource unit of the N time-domain resource units is later than the third time-domain resource unit by a second time offset, the second time offset being predefined or configurable.

In one subembodiment of the above embodiment, the second time offset is a difference subtracting an index of the third time-domain resource unit from an earliest time-domain resource unit of the N time-domain resource units, the second time offset being predefined or configurable.

In one subembodiment of the above embodiment, the first candidate resource pool comprises Y candidate resource sets, the Y being a positive integer greater than the Y1; any of the N time-domain resource units comprises time-domain resources occupied by at least one of the Y candidate resource sets.

In one embodiment, the first candidate resource pool is used to determine the first time window.

In one embodiment, an end time of the first time window is earlier than a start time of the first candidate resource pool.

In one embodiment, an end time of the first time window is a start time of the first candidate resource pool.

In one embodiment, the first time window comprises M time-domain resource units, and a first time-domain resource unit is a latest time-domain resource unit in the first time window; the first candidate resource pool comprises Y candidate resource sets, and the Y is a positive integer greater than the Y1; any of N time-domain resource units comprises time-domain resources occupied by at least one of the Y candidate resource sets; the N time-domain resource units are used to determine the M time-domain resource units.

In one subembodiment of the above embodiment, any two of the M time-domain resource units are orthogonal, and the M time-domain resource units are continuous.

In one subembodiment of the above embodiment, any two time-domain resource units of the N time-domain resource units are orthogonal, and the N time-domain resource units are continuous.

In one subembodiment of the above embodiment, a latest time-domain resource unit in the M time-domain resource units has a fourth time offset earlier than an earliest time-domain resource unit in the N time-domain resource units, the fourth time offset being predefined or configurable.

In one subembodiment of the above embodiment, a fourth time offset is a difference subtracting an index of a latest time-domain resource unit of the M time-domain resource units from an earliest time-domain resource unit of the N time-domain resource units, the fourth time offset being predefined or configurable.

In one embodiment, the first candidate resource pool is used to determine the determination time of the first resource set, and the determination time of the first resource set is used to determine the first time window.

In one embodiment, the X1 target parameter(s) is(are) measured by mW.

In one embodiment, the X1 target parameter(s) is(are) measured by dBm.

In one embodiment, the first control information comprises at least one of Channel State Information (CSI), a Reference Signals Received Power (RSRP), a Reference Signals Received Quality (RSRQ), a received signal strength indicator (RSSI), a Hybrid Automatic Repeat reQuest ACKnowledgement (HARQ-ACK), a Signal-to-Noise Ratio (SNR), or a Signal-to-Interference-plus-Noise Ratio (SINR).

In one embodiment, the first control information comprises CSI.

In one subembodiment of the above embodiment, the CSI comprises at least one of a Rank indicator (RI), a Precoding Matrix Indicator (PMI), a Channel Quality Indicator (CQI), or a Csi-reference signal Resource Indicator (CRI).

In one embodiment, the first control information comprises a RSRP.

In one embodiment, the first control information comprises a RSRQ.

In one embodiment, the first control information comprises a HARQ-ACK.

In one embodiment, the X1 signaling(s), the first signaling and the first control information are all transmitted through an air interface.

In one embodiment, the air interface is a radio interface used for communication between the second communication node and the first communication node in the present disclosure.

In one embodiment, the air interface is a radio interface used for communication between the first communication node and another UE in the present disclosure.

In one subembodiment, the air interface is a PC5 interface.

In one embodiment, the air interface is a radio interface between UEs.

In one embodiment, the air interface is a radio interface for sidelink transmission.

In one embodiment, the first radio signal carries given information.

In one subembodiment of the above embodiment, the given information is the first control information.

In one subembodiment of the above embodiment, the given information is information other than the first control information.

In one subembodiment of the above embodiment, the given information comprises the first control information and information other than the first control information.

In one subembodiment of the above embodiment, a given bit block indicates the given information. The given bit block comprises a positive integer number of bit(s) and is used to generate the first radio signal.

Embodiment 2

Figure 2:
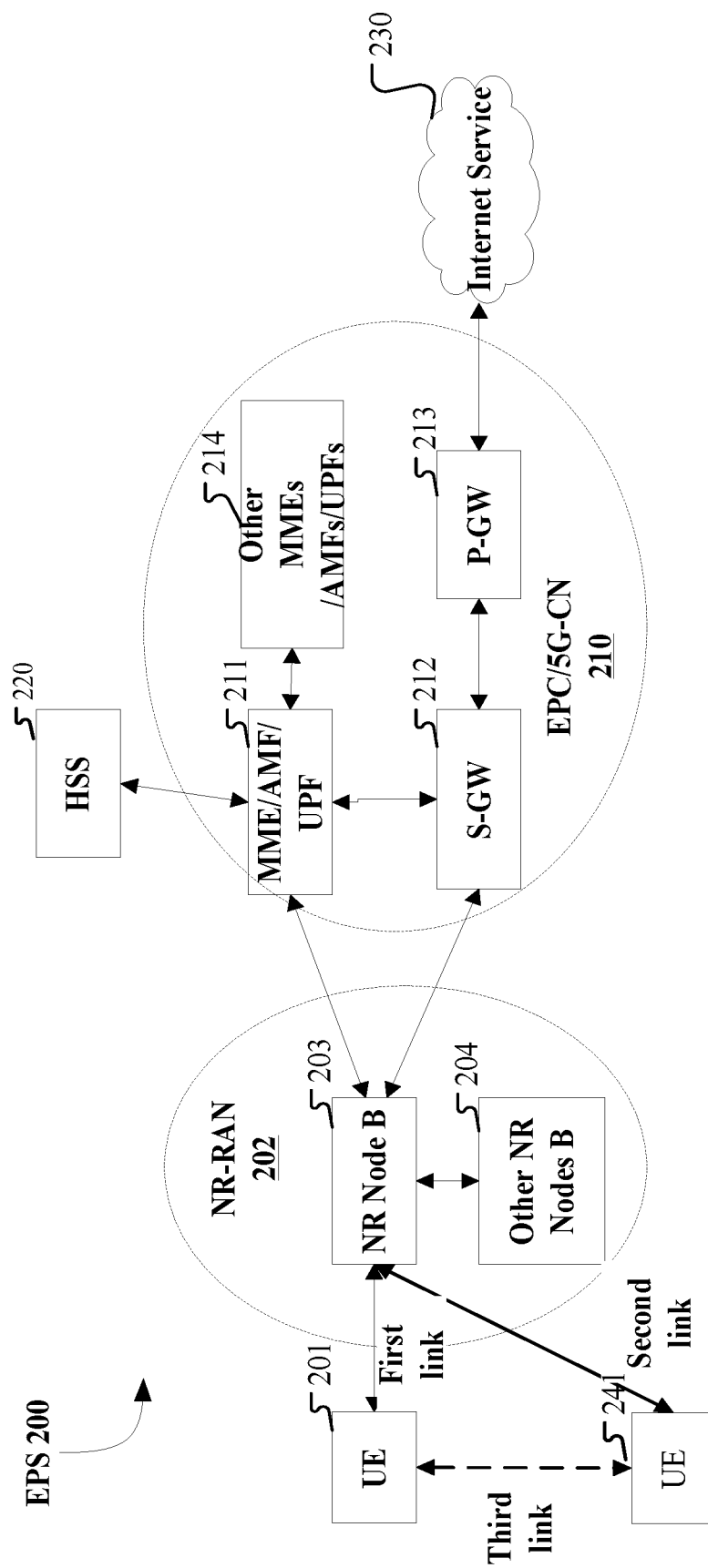
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 shows the network architecture 200 of 5G NR, Long-Term Evolution (LTE) and Long-Term Evolution Advanced (LTE-A). 5G NR or LTE network architecture 200 can be referred to as Evolved Packet System (EPS) 200 or some other appropriate terms. EPS 200 may comprise one or more UEs 201, Next Generation Radio Access Network (NG-RAN) 202, Evolved Packet Core (EPC)/5G-Core Network (5G-CN) 210, Home Subscriber Server (HSS) 220 and Internet Service 230. EPS can be interconnected with other access networks, but these entities/interfaces are not shown for simplicity. As shown in FIG. 2, the EPS provides packet switching services, while those skilled in the art will readily understand that the various concepts presented throughout this disclosure can be extended to networks providing circuit switched services or other cellular networks. The NG-RAN 202 comprises NR node B (gNB)203 and other gNB204. The gNB203 provides user and control plane protocol terminations for the UE201. The gNB203 may be connected to other gNB204s via an Xn interface (e.g., backhaul). The gNB203 may also be referred to as a base station, a base transceiver, a radio base station, a radio transceiver, a transceiver function, a basic service set (BSS), an extended service set (ESS), a transmission and reception point (TRP), or some other suitable terms. In a V2X network, the gNB203 may be a base station, a ground base station relayed through satellites, or a Road Side Unit (RSU) and etc. The gNB203 provides access point to EEPC/5G-CN210 for UE201. Examples of UE201 include cellular telephone, smart phone, session initiation protocol (SIP) telephone, laptop computer, personal digital assistant (PDA), satellite radios, global positioning system, multimedia device, video device, digital audio player(for example, MP3 player), camera, game console, unmanned aerial vehicle (UAV), aircrafts, narrowband Internet of Things (IoT) device, machine type communication equipment, land vehicles, automobiles, communication units in cars, wearable devices, or any other similar functional device. Those skilled in the art may also refer to UE201 as a mobile station, subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent terminal, mobile client terminal, client terminal, car terminal, Internet of Vehicle terminal or some other appropriate terminology. The gNB203 is connected to EPC/5G-CN210 via SING interface. EPC/5G-CN210 comprises Mobility Management Entity (MME)/Authentication Management Field (AMF)/User Plane Function (UPF)211, other MMEs/AMFs/UPFs 214, Service Gateway (S-GW) 212 and Packet Date Network Gateway (P-GW) 213. The MME/AMF/UPF211 is a control node that processes a signaling between UE201 and EPC/5G-CN210. In general, the MME/AMF/UPF211 provides bearer and connection management. All user Internet Protocol (IP) packets are transmitted through the S-GW212, which itself connected to the P-GW213. The P-GW213 provides IP address assignment and other functions to UE. The P-GW213 is connected to the Internet service 230. The Internet service 230 includes Internet protocol services corresponding to operators, specifically including Internet, Intranet, IP Multimedia Subsystem (IMS) and Packet Switching Streaming Services (PSS).

In one embodiment, the UE201 corresponds to the first communication node in the present disclosure.

In one embodiment, the UE201 supports transmission in a sidelink.

In one embodiment, the UE201 supports a PC5 interface.

In one embodiment, the UE201 supports Internet of Vehicles.

In one embodiment, the UE201 supports V2X service.

In one embodiment, the UE241 corresponds to the second communication node in the present disclosure.

In one embodiment, the UE241 supports transmission in a sidelink.

In one embodiment, the UE241 supports a PC5 interface.

In one embodiment, the UE241 supports Internet of Vehicles.

In one embodiment, the UE241 supports V2X service.

In one embodiment, the gNB203 corresponds to the second communication node in the present disclosure.

In one embodiment, the gNB203 supports Internet of Vehicles.

In one embodiment, the gNB203 supports V2X service.

Embodiment 3

Figure 3:
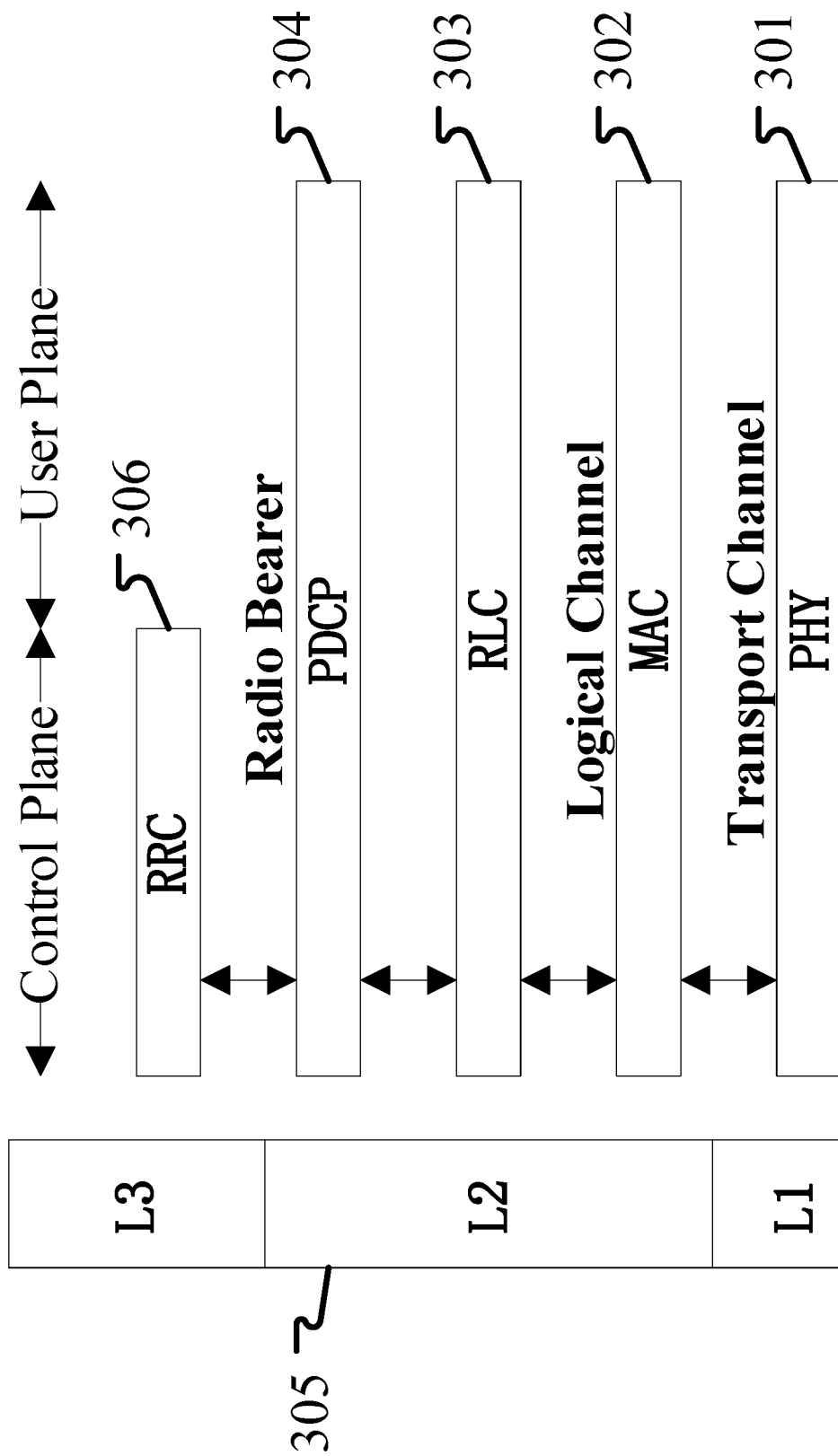
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating an embodiment of a radio protocol architecture for a user plane and a control plane. FIG. 3 illustrates a radio protocol architecture in three layers for a second communication node (UE or RSU in V2X) and a first communication node (gNB, eNB), or between two UEs, which is represented in three layers: Layer 1, 2 and 3. Layer 1 (L1) is the lowest layer and implements various physical layer (PHY) signal processing functions. Layer L1 will be called PHY301 in this disclosure. Layer 2 (L2) 305 is above PHY 301 and is responsible for links between a second communication node and a first communication node and between two UEs through the PHY 301. In a user plane, L2 305 comprises a Medium Access Control (MAC) sublayer 302, a Radio Link Control (RLC) sublayer 303 and a Packet Data Convergence Protocol (PDCP) sublayer 304, which terminate at a first communication node of the network side. Although not illustrated, the second communication node may have several higher layers above L2 305 including a network layer (e.g., IP layer) terminating at P-GW of the network side and an application layer terminating at the other end of the connection (e.g., remote UE, server, and etc.). The PDCP sublayer 304 provides multiplexing between different radio carriers and logical channels. The PDCP sublayer 304 also provides header compression for a higher layer packet to reduce radio transmission overhead, provides security by encrypting a data packet, and supports for the handover of a second communication node between first communication nodes. The RLC sublayer 303 provides segmentation and reassembling of a higher layer data packet, retransmission of a lost packet, and reordering of a packet to compensate for disordered reception caused by HARQ. The MAC sublayer 302 provides multiplexing between logic and transport channels. The MAC sublayer 302 is also responsible for allocating various radio resources (e.g., resource blocks) in a cell between second communication nodes. The MAC sublayer 302 is also responsible for HARQ operations. In a control plane, the radio protocol architecture for a second communication node and a first communication node is roughly the same for physical layer 301 and L2 305 but there is no header compression function for the control plane. The control plane also includes a Radio Resource Control (RRC) sublayer 306 in layer 3 (L3). The RRC sublayer 306 is responsible for obtaining radio resources (i.e., radio bearer) and configuring the lower layer with an RRC signaling between a first communication node and a second communication node.

In one embodiment, the radio protocol architecture in FIG. 3 is applicable to the second communication node in the present disclosure.

In one embodiment, the radio protocol architecture in FIG. 3 is applicable to the first communication node in the present disclosure.

In one embodiment, the signaling monitoring in the present disclosure is performed on the PHY301.

In one embodiment, the first signaling in the present disclosure is generated on the PHY 301.

In one embodiment, the first radio signal in the present disclosure is generated on the PHY 301.

In one embodiment, the second signaling in the present disclosure is generated on the PHY 301.

In one embodiment, the second radio signal in the present disclosure is generated on the PHY 301.

In one embodiment, the first resource set in the present disclosure is determined on the PHY301.

Embodiment 4

Figure 4:
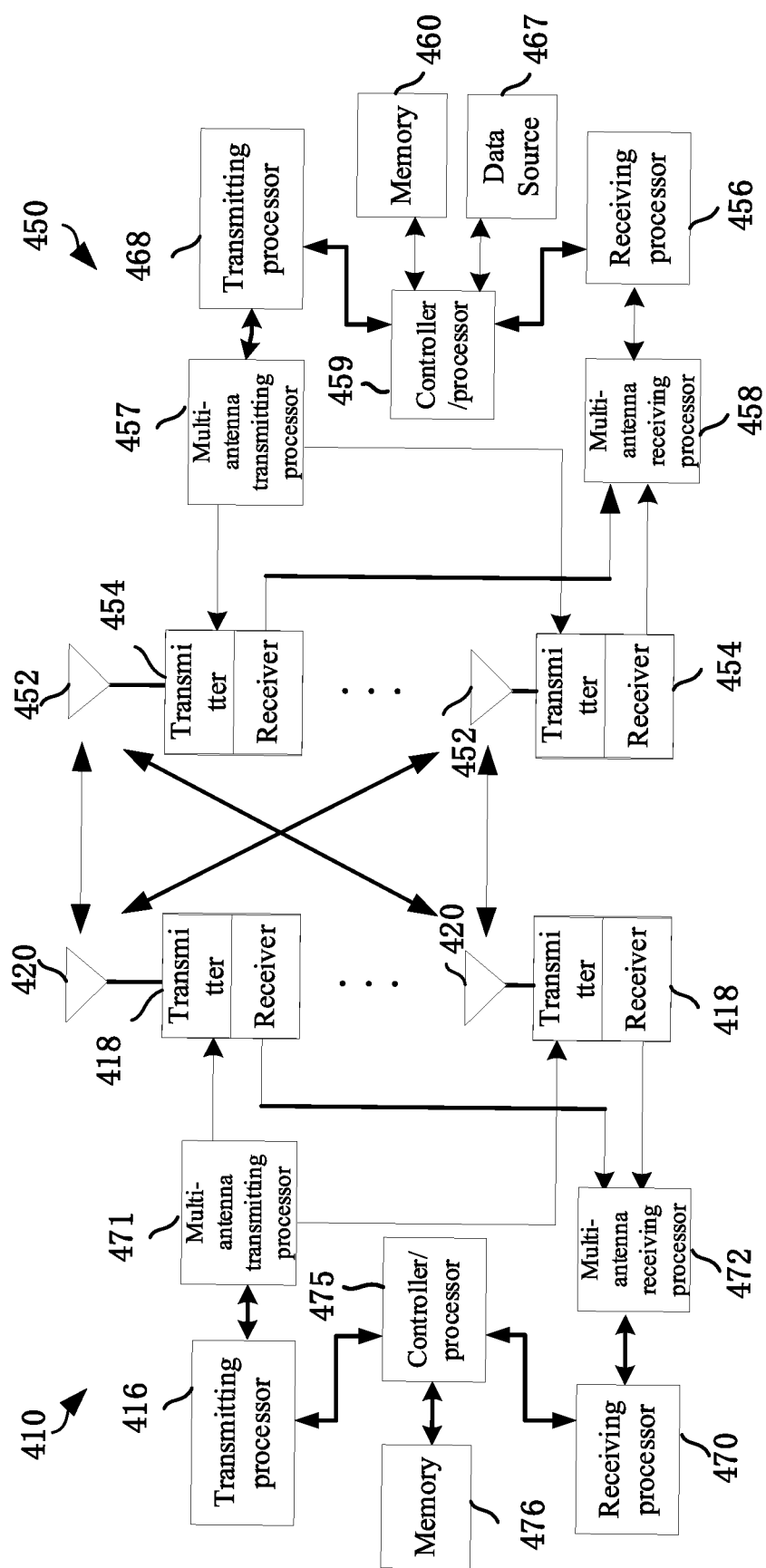
FIG. 4 illustrates a schematic diagram of a second communication node and a first communication node according to one embodiment of the present disclosure.

Embodiment 4 illustrates a schematic diagram of a first communication node and a second communication node according to the present disclosure, as shown in FIG. 4.

FIG. 4 is a block diagram of a first communication node 450 and a second communication node 410 communicating with each other in an access network.

The first communication node 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication node 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In the transmission from the second communication node 410 to the first communication node 450, a higher layer data packet from the core network is provided to the controller/processor 475 at the second communication device 410. The controller/processor 475 implements the functionality of L2 layer. In the transmission from the second communication node 410 to the second communication node 450, the controller/processor 475 provides header compression, encryption, packet segmentation and reordering, multiplexing between logic and transport channels, and radio resource allocation to the first communication device 450 based on various priority metrics. The controller/processor 475 is also responsible for retransmission of a lost packet and a signaling to the first communication node 450. The transmitting processor 416 and the multi-antenna transmitting processor 471 implement various signal processing functions on the L1 layer (i.e., a physical layer). The transmitting processor 416 implements encoding and interleaving to facilitate forward error correction (FEC) at the first communication node 450, and mapping of signal clusters based on various modulation schemes, (i.e., binary phase shift keying (BPSK), quadrature phase shift keying (QPSK), M-phase shift keying (M-PSK), and M quadrature amplitude modulation (M-QAM). The multi-antenna transmitting processor 471 performs digital spatial precoding on the encoded and modulated symbols, including codebook-based precoding and non-codebook-based precoding, and beamforming processing to generate one or more spatial streams. The transmitting processor 416 then maps each spatial stream onto a subcarrier, multiplexes it with a reference signal (e.g., pilot) in time and/or frequency domain, and then uses the Inverse Fast Fourier Transform (IFFT) to generate a physical channel carrying a time-domain multicarrier symbol stream. Then the multi-antenna transmitting processor 471 performs transmission analog precoding/beamforming operation on the time-domain multicarrier symbol stream. Each transmitter 418 converts the baseband multi-carrier symbol stream provided by the multi-antenna transmitting processor 471 into a radio-frequency stream, which is then provided to different antenna 420.

In the transmission from the second communication node 410 to the first communication node 450, at the first communication device 450, each receiver 454 receives signals through its corresponding antenna 452. Each receiver 454 recovers information modulated to a radio frequency carrier and converts the radio frequency stream into a baseband multicarrier symbol stream to be provided to a receiving processor 456. The receiving processor 456 and the multi-antenna receiving processor 458 implement various signal processing functions of the layer L1. The multi-antenna receiving processor 458 performs a receiving analog precoding/beamforming operation on the baseband multicarrier symbol stream from the receiver 454. The receiving processor 456 uses FFT to convert the baseband multi-carrier symbol streams operated by the receiving analog precoding/beamforming operation from time domain to frequency domain. In frequency domain, the physical layer data signal and the reference signal are demultiplexed by the receiving processor 456, wherein the reference signal is to be used for channel estimation, and the data signal goes through multi-antenna detection in the multiple antenna receiving processor 458 to recover any spatial stream destined for the first communication node 450. Symbols on each spatial stream are demodulated and restored in the receiving processor 456, and a soft decision is generated. The receiving processor 456 then decodes and deinterleaves the soft decision to recover a higher layer data and a control signal transmitted by the second communication node 410 on a physical channel. The higher layer data and the control signal are then provided to the controller/processor 459. The controller/processor 459 implements functions of L2. The controller/processor 459 may be associated with a memory 460 that stores program code and data. The memory 480 may be called a computer readable medium. In the transmission from the second communication node 410 to the first communication node 450, the controller/processor 459 provides demultiplexing, packet reassembling, decryption, header decompression and control signal processing between transport and logical channels to recover a higher layer packet from the core network. The higher layer packet is then provided to all protocol layers above the layer L2, or various control signals can be provided to L3 for processing.

In the transmission from the first communication node 450 to the second communication node 410, at the first communication node 450, a data source 467 is used to provide the higher layer data packet to the controller/processor 459. The data source 467 represents all protocol layers above the L2 layer; similar to the transmission function at the second communication node 410 described in the transmission from the second communication node 410 to the first communication node 450, the controller/processor 459 implements header compression, encryption, packet segmentation and reordering, and multiplexing between logical and transport channels based on wireless resource allocation, thus implementing L2 functions on the user plane and control plane. The controller/processor 459 is also responsible for retransmission of a lost packet and a signaling to the second communication node 410. The transmitting processor 468 performs modulation mapping, channel coding, and the multi-antenna transmitting processor 457 performs digital multi-antenna spatial precoding, including codebook-based precoding and non-codebook-based precoding, as well as beamforming. Then the transmitting processor 468 modulates a generated spatial stream into a multicarrier/single-carrier symbol stream, which is provided to different antennas 452 via the transmitter 454 after analog precoding/beamforming operations in the multi-antenna transmitting processor 457. Each transmitter 454 first converts a baseband symbol stream provided by the multi-antenna transmitting processor 457 into a radio-frequency symbol stream, and then provides it to the antenna 452.

In the transmission from the first communication node 450 to the second communication node 410, the function at the second communication node 410 is similar to the receiving function at the first communication node 450 described in the transmission from the second communication node 410 to the first communication node 450. Each receiver 418 receives a radio frequency signal through its corresponding antenna 420, converts the received radio frequency signal into a baseband signal, and provides the baseband signal to a multi-antenna receiving processor 472 and a receiving processor 470. The receiving processor 470 and the multi-antenna receiving processor 472 jointly implement the function of the layer L1. The controller/processor 475 implements functions of layer L2. The controller/processor 475 may be associated with a memory 476 that stores program code and data. The memory 476 may be called a computer readable medium. In the transmission from the first communication node 450 to the second communication node 410, the controller/processor 475 provides demultiplexing between transport and logical channels, packet reassembling, decryption, header decompression and control signal processing to recover a higher layer packet from UE450. A higher layer data packet from the controller/processor 475 can be provided to a core network;

In one embodiment, the first communication node 450 is a UE, and the second communication node 410 is a UE.

In one embodiment, the first communication node 450 is a UE, and the second communication node 410 is a base station.

In one embodiment, the first communication node 450 is a UE, and the second communication node 410 is a relay node.

In one embodiment, the first communication node 450 is a relay node, and the second communication node 410 is a UE.

In one embodiment, the first communication node 450 is a relay node, and the second communication node 410 is a relay node.

In one embodiment, the first communication node 450 is a relay node, and the second communication node 410 is a base station.

In one embodiment, the first communication node 450 comprises: at least one controller/processor; the at least one controller/processor is responsible for HARQ operation.

In one embodiment, the second communication node 410 comprises: at least one controller/processor; the at least one controller/processor is responsible for HARQ operation.

In one embodiment, the second communication node 410 comprises: at least one controller/processor; the at least one controller/processor is responsible for error detection using Acknowledgement (ACK) and/or Negative Acknowledgement (NACK) protocols to support HARQ operations.

In one embodiment, the first communication node 450 comprises: at least one processor and at least one memory, the at least one memory comprises computer program codes; the at least one memory and the computer program codes are configured to be used in collaboration with the at least one processor. The first communication node 450 at least: performs signaling monitoring in a first time window, and X1 signaling(s) is(are) detected in the signaling monitoring process, X1 being a non-negative integer; determines a first resource set from a first candidate resource pool; transmits a first signaling; transmits a first radio signal in the first resource set; herein the X1 signaling(s) and X1 target parameter(s) are used to determine Y1 candidate resource set(s) from the first candidate resource pool, Y1 being a non-negative integer; the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling; whether the first radio signal carries first control information is used to determine the X1 target parameter(s).

In one embodiment, the first communication node 450 comprises: a computer readable instruction program generates an action when executed by at least one processor, including: performing signaling monitoring in a first time window, and X1 signaling(s) is(are) detected in the signaling monitoring process, X1 being a non-negative integer; determining a first resource set from a first candidate resource pool; transmitting a first signaling; and transmitting a first radio signal in the first resource set; herein the X1 signaling(s) and X1 target parameter(s) are used to determine Y1 candidate resource set(s) from the first candidate resource pool, Y1 being a non-negative integer; the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling; whether the first radio signal carries first control information is used to determine the X1 target parameter(s).

In one embodiment, the second communication node 410 comprises: at least one processor and at least one memory, the at least one memory comprises computer program codes; the at least one memory and the computer program codes are configured to be used in collaboration with the at least one processor. The second communication node 410 device at least: performs signaling monitoring in a first candidate resource pool; receives a first signaling; receives a first signaling in a first resource set; X1 target parameter(s) is(are) used by a communication node transmitting the first signaling to determine Y1 candidate resource set(s) from the first candidate resource pool, X1 being a non-negative integer and Y1 being a non-negative integer; the first resource set is a candidate resource set in the first candidate resource pool other than the Y1 candidate resource set(s); the first signaling is used to determine time-frequency resources occupied by the first radio signal; whether the first radio signal carries first control information is used by the communication node transmitting the first signaling to determine the X1 target parameter(s).

In one embodiment, the second communication node 410 comprises: a computer readable instruction program generates an action when executed by at least one processor, including: performing signaling monitoring in a first candidate resource pool; receiving a first signaling; and receiving a first signaling in a first resource set; wherein X1 target parameter(s) is(are) used by a communication node transmitting the first signaling to determine Y1 candidate resource set(s) from the first candidate resource pool, X1 being a non-negative integer and Y1 being a non-negative integer; the first resource set is a candidate resource set in the first candidate resource pool other than the Y1 candidate resource set(s); the first signaling is used to determine time-frequency resources occupied by the first radio signal; whether the first radio signal carries first control information is used by the communication node transmitting the first signaling to determine the X1 target parameter(s).

In one embodiment, at least one of the antenna 452, the receiver 454, the multi-antenna receiving processor 458, the receiving processor 456, the controller/processor 459, the memory 460, or the data source 467 is used to receive the second signaling in the present disclosure.

In one embodiment, at least one of the antenna 420, the transmitter 418, the multi-antenna transmitting processor 471, the transmitting processor 416, the controller/processor 475, or the memory 476 is used to transmit the second signaling in the present disclosure.

In one embodiment, at least one of the antenna 452, the receiver 454, the multi-antenna receiving processor 458, the receiving processor 456, the controller/processor 459, the memory 460, or the data source 467 is used to receive the second radio signal in the present disclosure.

In one embodiment, at least one of the antenna 420, the transmitter 418, the multi-antenna transmitting processor 471, the transmitting processor 416, the controller/processor 475, or the memory 476 is used to transmit the second radio signal in the present disclosure.

In one embodiment, at least one of the antenna 452, the receiver 454, the multi-antenna receiving processor 458, the receiving processor 456, the controller/processor 459, the memory 460, or the data source 467 is used to perform the signaling monitoring in the present disclosure in the first time window in the present disclosure.

In one embodiment, at least one of the antenna 452, the receiver 454, the multi-antenna receiving processor 458, the receiving processor 456, the controller/processor 459, the memory 460, or the data source 467 is used to determine the first resource set in the present disclosure from the first candidate resource pool in the present disclosure.

In one embodiment, at least one of the antenna 452, the transmitter 454, the multi-antenna transmitting processor 458, the transmitting processor 468, the controller/processor 459, the memory 460, or the data sources 467 is used to receive the first signaling in the present disclosure;

In one embodiment, at least one of the antenna 420, the receiver 418, the multi-antenna receiving processor 472, the receiving processor 470, the controller/processor 475, or the memory 476 is used to receive the first signaling in the present disclosure.

In one embodiment, at least one of the antenna 452, the transmitter 454, the multi antenna transmission processor 458, the transmission processor 468, the controller/processor 459, the memory 460, or the data source 467 is used to transmit the first radio signal in the present disclosure in the first resource set in the present disclosure.

In one embodiment, at least one of the antenna 420, the receiver 418, the multi-antenna receiving processor 472, the receiving processor 470, the controller/processor 475, or the memory 476 is used to the receive the first radio signal in the present disclosure in the first resource set in the present disclosure.

Embodiment 5

Figure 5:
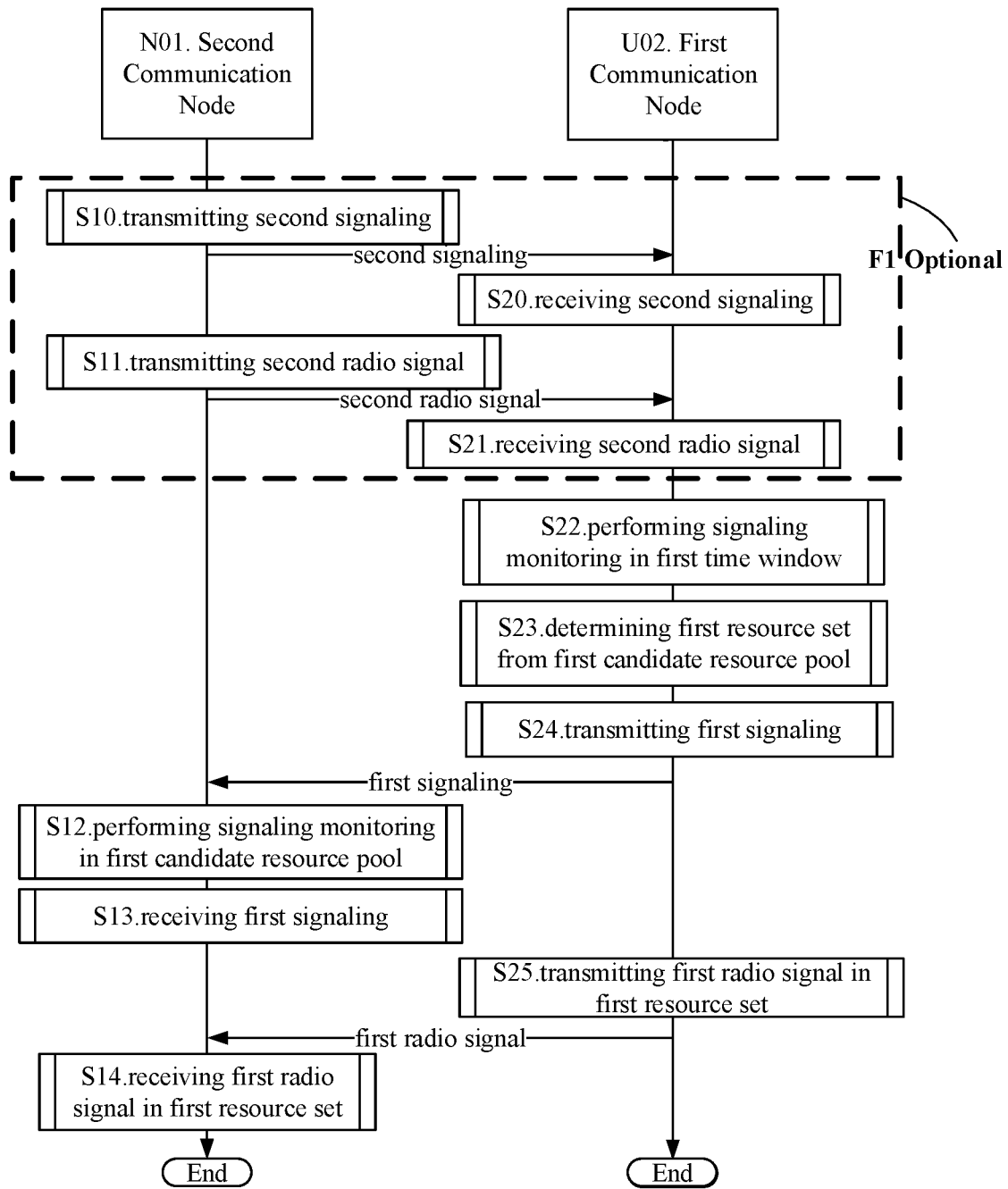
FIG. 5 illustrates a flow chart of radio signal transmission according to one embodiment of the present disclosure.

Embodiment 5 illustrates a flow chart of radio signal transmission according to one embodiment in the present disclosure, as shown in FIG. 5. In FIG. 5, a first communication node UO2 and a second communication node NO1 communicate through an air interface. In FIG. 5, steps in the dotted box F1 are optional.

The second communication node NO1 transmits a second signaling in step S10; transmits a second radio signal in step S11; performs signaling monitoring in a first candidate resource pool in step S12; transmits a first signaling in step S13; and receives a first radio signal in a first resource set in step S14.

The first communication node UO2 receives a second signaling in step S20; receives a second radio signal in step S21; performs signaling monitoring in a first time window in step S22; determines a first resource set from a first candidate resource pool in step S23; transmits a first signaling in step S24; and transmits a first radio signal in a first resource set in step S25.

In Embodiment 5, X1 signaling(s) is(are) detected by the first communication node UO2 in the signaling monitoring process, X1 being a non-negative integer; the X1 signaling(s) and X1 target parameter(s) are used by the first communication node UO2 to determine Y1 candidate resource set(s) from the first candidate resource pool, Y1 being a non-negative integer; the first resource set is a candidate resource set in the first candidate resource pool other than the Y1 candidate resource set(s); the first signaling is used by the second communication node NO1 to determine time-frequency resources occupied by the first radio signal; an end time of the first time window is not later than a start time for transmission of the first signaling; whether the first radio signal carries first control information is used by the first communication node UO2 to determine the X1 target parameter(s). The second signaling is used by the first communication node UO2 to determine time-frequency resources occupied by the second radio signal, and the first control information is related to the second radio signal.

In one embodiment, the second communication node NO1 also performs signaling monitoring in time-frequency resources other than the first candidate resource pool.

In one embodiment, the first candidate resource pool comprises a candidate resource set used for transmission, and the signaling monitoring on the candidate resource set used for transmission in the first candidate resource pool is not performed by the second communication node N01.

In one embodiment, the first candidate resource pool comprises a candidate resource set used for transmission by the second communication node NO1, and the signaling monitoring on the candidate resource set occupied by transmission in the first candidate resource pool is not performed.

In one embodiment, a start time of the first resource set is later than an end time for transmission of the second radio signal.

In one embodiment, the second signaling is a physical layer signaling.

In one embodiment, the second signaling is Broadcast.
In one embodiment, the second signaling is Groupcast.
In one embodiment, the second signaling is Unicast.

In one embodiment, the second signaling is transmitted through a Sidelink.

In one embodiment, the second signaling carries a piece of Sidelink Control Information (SCI).

In one embodiment, the second signaling comprises part or all of Fields of a piece of Sidelink Control Information (SCI).

In one embodiment, the second signaling is transmitted through a Physical Sidelink Control Channel (PSCCH).

In one embodiment, a transmitter of the second signaling is the second communication node in the present disclosure.

In one embodiment, a target receiver of the second signaling is the first communication node in the present disclosure.

In one embodiment, the second signaling directly indicates time-frequency resources occupied by the second radio signal.

In one embodiment, the second signaling indirectly indicates time-frequency resources occupied by the second radio signal.

In one embodiment, the second signaling explicitly indicates time-frequency resources occupied by the second radio signal.

In one embodiment, the second signaling implicitly indicates time-frequency resources occupied by the second radio signal.

In one embodiment, time-frequency resources occupied by the second signaling are used by the first communication node UO2 to determine time-frequency resources occupied by the second radio signal.

In one embodiment, time-frequency resources occupied by the second signaling is related to time-frequency resources occupied by the second radio signal, and time-frequency resources occupied by the second radio signal can be inferred according to time-frequency resources occupied by the second signaling.

In one embodiment, time-domain resources occupied by the second signaling are used by the first communication node UO2 to determine time-domain resources occupied by the second radio signal.

In one embodiment, time-domain resources occupied by the second signaling are related to time-domain resources occupied by the second radio signal, and time-domain resources occupied by the second radio signal can be inferred according to time-domain resources occupied by the second signaling; the second signaling indicates frequency-domain resources occupied by the second radio signal.

In one embodiment, frequency-domain resources occupied by the second signaling are used by the first communication node UO2 to determine frequency-domain resources occupied by the second radio signal.

In one embodiment, frequency-domain resources occupied by the second signaling are related to frequency-domain resources occupied by the second radio signal, and frequency-domain resources occupied by the second radio signal can be inferred according to frequency-domain resources occupied by the second signaling; the second signaling indicates time-domain resources occupied by the second radio signal.

In one embodiment, the second signaling also indicates at least one of a Modulation Coding Scheme (MCS) adopted by the second radio signal or a Redundancy Version (RV) adopted by the second radio signal.

In one embodiment, the second signaling also indicates a Redundancy Version adopted by the second radio signal.

In one embodiment, the second signaling also indicates an MCS adopted by the second radio signal.

In one embodiment, the second radio signal is transmitted through a Sidelink Shared Channel (SL-SCH).

In one embodiment, the second radio signal is transmitted through a Sidelink.

In one embodiment, the second radio signal is transmitted through a PC5 interface.

In one embodiment, the second radio signal is Unicast.

In one embodiment, the second radio signal is Groupcast.

In one embodiment, the second radio signal is Broadcast.

In one embodiment, the second radio signal is transmitted through a Physical Sidelink Shared Channel (PSSCH).

In one embodiment, the second radio signal comprises data, and the first control information is used by the second communication node NO1 to determine whether the second radio signal is correctly received.

In one embodiment, the second radio signal carries a transmission block, and the first control information is used by the second communication node NO1 to determine whether the second radio signal is correctly received.

In one subembodiment of the above embodiment, the first control information comprises a HARQ-ACK.

In one embodiment, the second radio signal comprises a reference signal, and the first control information is obtained based on a measurement of the reference signal comprised in the second radio signal.

In one subembodiment of the above embodiment, the second radio signal comprises at least one of a SideLink Channel State Information-Reference Signal (SL CSI-RS) or SideLink CSI-interference measurement resource (SL CSI-IMR).

In one subembodiment of the above embodiment, the reference signal comprised in the second radio signal comprises a SL CSI-RS.

In one subembodiment of the above embodiment, the first control information comprises at least one of CSI, RSRP, RSRQ, RSSI, SNR or SINR.

In one subembodiment of the above embodiment, the first control information comprises CSI.

In one subembodiment of the above embodiment, the first control information comprises RSRP.

In one subembodiment of the above embodiment, the first control information comprises RSRQ.

In one subembodiment of the above embodiment, the first control information comprises RSSI.

In one subembodiment of the above embodiment, the first control information comprises SNR.

In one subembodiment of the above embodiment, the first control information comprises SINR.

In one embodiment, the second signaling is used by the first communication node UO2 to determine the first candidate resource pool.

In one embodiment, the second signaling directly indicates the first candidate resource pool.

In one embodiment, the second signaling indirectly indicates the first candidate resource pool.

In one embodiment, the second signaling explicitly indicates the first candidate resource pool.

In one embodiment, the second signaling implicitly indicates the first candidate resource pool.

In one embodiment, time-frequency resources occupied by the second signaling is used by the first communication node UO2 to determine the first candidate resource pool.

In one embodiment, the second signaling is used by the first communication node UO2 to determine N time-domain resource units, which comprise time-domain resources occupied by the first candidate resource pool, N being a positive integer.

In one subembodiment of the above embodiment, the first candidate resource pool comprises Y candidate resource sets, the Y being a positive integer greater than the Y1; any of the N time-domain resource units comprises time-domain resources occupied by at least one of the Y candidate resource sets.

In one subembodiment of the above embodiment, the second signaling directly indicates the N time-domain resource units.

In one subembodiment of the above embodiment, the second signaling indirectly indicates the N time-domain resource units.

In one subembodiment of the above embodiment, the second signaling explicitly indicates the N time-domain resource units.

In one subembodiment of the above embodiment, the second signaling implicitly indicates the N time-domain resource units.

In one subembodiment of the above embodiment, a fifth time-domain resource unit is a time-domain resource unit comprising time-domain resources occupied by the second signaling, and an earliest time-domain resource unit of the N time-domain resource units is a third time offset later than the fifth time-domain resource unit; the third time offset is predefined or configurable, or, is indicated by the second signaling.

In one subembodiment of the above embodiment, a third time offset is a difference subtracting an index of the fifth time-domain resource unit from an earliest time-domain resource unit of the N time-domain resource unit; the third time offset is predefined or configurable, or, the third time offset is indicated by the second signaling.

In one embodiment, the second signaling is used by the first communication node UO2 to determine the first time window.

In one embodiment, the first time window comprises M time-domain resource units, and a first time-domain resource unit is a latest time-domain resource unit in the first time window; a fifth time-domain resource unit is a time-domain resource unit comprising time-domain resources occupied by the second signaling, and the fifth time-domain resource unit is used by the first communication node UO2 to determine the M time-domain resource units.

In one subembodiment of the above embodiment, any two of the M time-domain resource units are orthogonal, the M time-domain resource units being continuous.

In one subembodiment of the above embodiment, a latest time-domain resource unit in the M time-domain resource units has a fifth time offset earlier than the fifth time-domain resource unit, and the fifth time offset is predefined or configurable.

In one subembodiment of the above embodiment, a fifth time offset is a difference subtracting an index of a latest one of the M time-domain resource units from an index of the fifth time-domain resource unit, and the fifth time offset is predefined or configurable.

Embodiment 6

Figure 6:
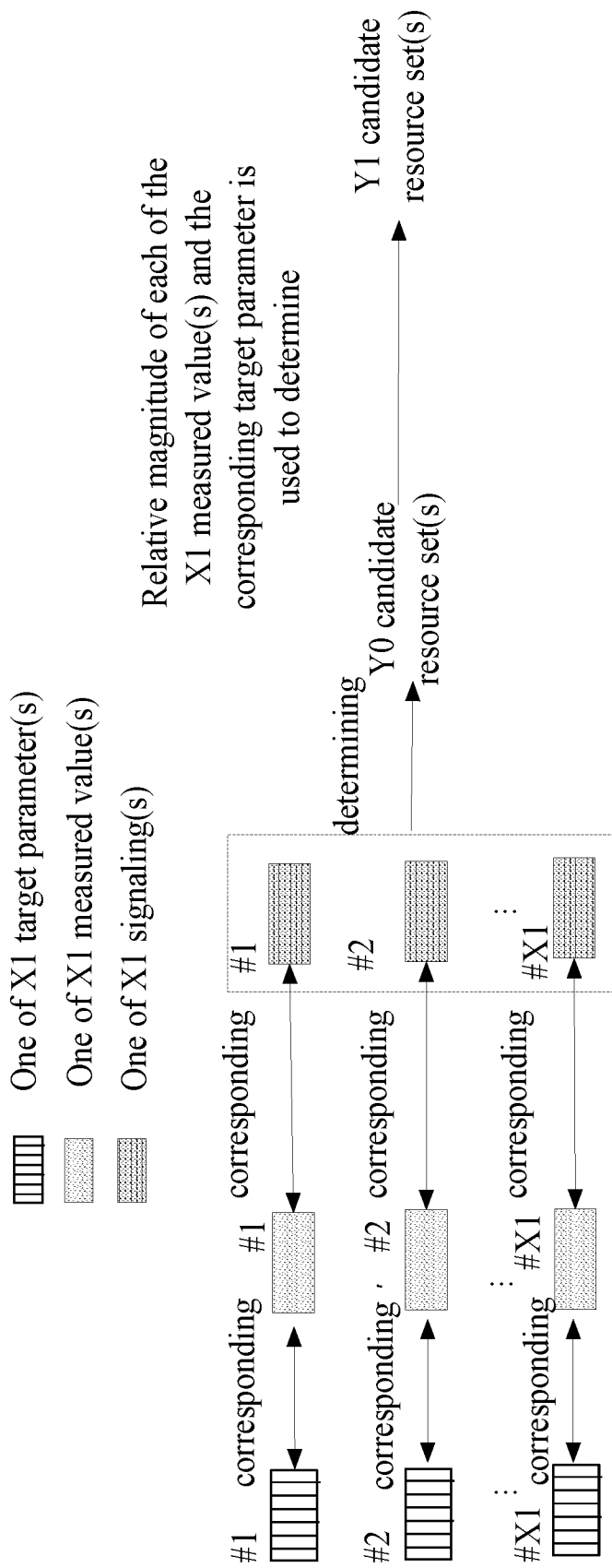
FIG. 6 illustrates a schematic diagram of determining Y1 candidate resource set(s) according to one embodiment of the present disclosure.

Embodiment 6 illustrates a schematic diagram of determining Y1 candidate resource set(s) according to one embodiment of the present disclosure, as shown in FIG. 6;

In Embodiment 6, the X1 in the present disclosure is greater than 0, and the X1 signaling(s) in the present disclosure corresponds(correspond) to X1 measured value(s). The X1 signaling(s) is(are) used to determine Y0 candidate resource set(s) from the first candidate resource pool in the present disclosure, Y0 being a non-negative integer not less than the Y1; when the Y0 is greater than 0, the X1 measured value(s) respectively corresponds(correspond) to the X1 target parameter(s) in the present disclosure, and relative magnitude of each of the X1 measured value(s) and the corresponding target parameter in the X1 target parameter(s) is used to determine the Y1 candidate resource set(s) from the Y0 candidate resource set(s); when the Y1 is greater than 0, any of the Y1 candidate resource set(s) is one of the Y0 candidate resource set(s).

In one embodiment, the Y0 is equal to 0 and the Y1 is equal to 0.

In one embodiment, when the Y0 is greater than 0, any of the Y0 candidate resource set(s) is a candidate resource set in the first candidate resource pool;

In one embodiment, the first candidate resource pool comprises Y candidate resource sets, the Y being a positive integer greater than the Y1; when the Y0 is greater than 0, any of the Y0 candidate resource set(s) is a candidate resource set of Y candidate resource sets, the Y0 being not greater than the Y.

In one embodiment, the Y0 candidate resource set(s) is(are) composed of all candidate resource set(s) determined by the X1 signaling(s) in the first candidate resource pool.

In one subembodiment of the above embodiment, the word "determine" is to indicate or reserve.

In one subembodiment of the above embodiment, the word "determine" is to indicate.

In one subembodiment of the above embodiment, the word "determine" is to reserve.

In one embodiment, the X1 is greater than 0, and any of the X1 signaling(s) is used to determine at least one of the Y0 candidate resource set(s) from the first candidate resource pool.

In one embodiment, the X1 signaling(s) is(are) used to determine Z candidate resource set(s), and the Y0 candidate resource set(s) is(are) composed of all candidate resource set(s) belonging to the first candidate resource pool in the Z candidate resource set(s).

In one subembodiment of the above embodiment, the X1 signaling(s) indicate(s) or reserve(s) the Z candidate resource set(s).

In one subembodiment of the above embodiment, the X1 signaling(s) indicate(s) the Z candidate resource set(s).

In one subembodiment of the above embodiment, the X1 signaling(s) reserve(s) the Z candidate resource set(s).

In one embodiment, the X1 measured value(s) is(are) measured by milliwatt.

In one embodiment, the X1 measured value(s) is(are) measured by dBm.

In one embodiment, the X1 measured value(s) is(are) respectively X1 PSSCH-RSRP(s).

In one embodiment, the X1 measured value(s) is(are) respectively X1 RSRP(s).

In one embodiment, the X1 measured value(s) is(are) respectively X1 RSRQ(s).

In one embodiment, the X1 measured value(s) is(are) respectively X1 RSSI(s).

In one embodiment, the X1 measured value(s) is(are) respectively X1 average power(s).

In one embodiment, the X1 measured value(s) is(are) respectively X1 average energy(energies).

In one embodiment, the X1 signaling(s) is(are) respectively used to determine X1 resource set(s), and the X1 measured value(s) is(are) respectively measured in the X1 resource set(s).

In one subembodiment of the above embodiment, the X1 signaling(s) explicitly indicate(s) the X1 resource set(s).

In one subembodiment of the above embodiment, the X1 signaling(s) implicitly indicate(s) the X1 resource set(s).

In one subembodiment of the above embodiment, the X1 resource set(s) respectively comprise(s) time-frequency resources occupied by transmission of X1 PSSCH.

In one subembodiment of the above embodiment, the X1 resource set(s) respectively comprise(s) time-frequency resources occupied by X1 demodulation reference signal(s), and the X1 demodulation reference signal(s) is(are) respectively used for demodulation of transmission of X1 PSSCH(s), the X1 signaling(s) being respectively used to determine the transmission of X1 PSSCH(s).

In one subembodiment of the above embodiment, the X1 resource set(s) respectively comprise(s) time-frequency resources occupied by X1 demodulation reference signal(s), the X1 demodulation reference signal(s) being respectively used for demodulation of PSSCH transmission associated with the X1 signaling(s).

In one subembodiment of the above embodiment, the X1 measured value(s) is(are) respectively X1 average received energy(energies) measured in the X1 resource set(s).

In one subembodiment of the above embodiment, the X1 measured value(s) is(are) respectively X1 average received power(s) measured in the X1 resource set(s).

In one subembodiment of the above embodiment, the X1 measured value(s) is(are) respectively X1 RSRP of the X1 resource set(s).

In one subembodiment of the above embodiment, the X1 resource set(s) comprise(s) X1 RE set(s), and the X1 measured value(s) corresponds(correspond) to the X1 RE set(s) respectively; the given measured value is any of the X1 measured value(s); the given RE set is a RE set corresponding to the given measured value in the X1 RE set(s), and the given measured value is an average received power on each RE in the given RE set.

In one subembodiment of the above embodiment, the X1 resource set(s) comprise(s) X1 RE set(s), and the X1 measured value(s) corresponds(correspond) to the X1 RE set(s) respectively; the given measured value is any of the X1 measured value(s); the given RE set is a RE set corresponding to the given measured value in the X1 RE set(s), and the given measured value is an average received energy on each RE in the given RE set.

In one embodiment, when the Y0 is greater than 0, X2 measured value(s) comprise(s) all measured value(s) greater than the corresponding target parameter(s) in the X1 measured value(s), X2 being a non-negative integer not greater than the X1; when the X2 is equal to 0, the Y1 is equal to 0; when the X2 is greater than 0, the X2 signaling(s) in the X1 signaling(s) respectively corresponds(correspond) to the X2 measured value(s), and the Y1 candidate resource set(s) is(are) all candidate resource set(s) determined by the X2 signaling(s) in the Y0 candidate resource set(s).

In one subembodiment of the above embodiment, the X2 measured value(s) is(are) all measured value(s) greater than the corresponding target parameter(s) in the X1 measured value(s).

In one subembodiment of the above embodiment, the X2 measured value(s) is(are) all measured value(s) not less than the corresponding target parameter(s) in the X1 measured value(s).

In one subembodiment of the above embodiment, a given measured value is one of the X1 measured value(s), and a given target parameter is one of the X1 target parameter(s) corresponding to the given measured value; when the given measured value is greater than the given target parameter, the given measured value is one of the X2 measured value(s).

In one subembodiment of the above embodiment, a given measured value is one of the X1 measured value(s), and a given target parameter is one of the X1 target parameter(s) corresponding to the given measured value; when the given measured value is less than the given target parameter, the given measured value is one measured value other than the X2 measured value(s).

In one subembodiment of the above embodiment, a given measured value is one of the X1 measured value(s), and a given target parameter is one of the X1 target parameter(s) corresponding to the given measured value; when the given measured value is equal to the given target parameter, the given measured value is one of the X2 measured value(s).

In one subembodiment of the above embodiment, a given measured value is one of the X1 measured value(s), and a given target parameter is one of the X1 target parameter(s) corresponding to the given measured value; when the given measured value is equal to the given target parameter, the given measured value is one measured value other than the X2 measured value(s).

In one embodiment, when the Y0 is greater than 0, X2 measured value(s) comprise(s) all measured value(s) less than the corresponding target parameter(s) in the X1 measured value(s), X2 being a non-negative integer not greater than the X1; when the X2 is equal to 0, the Y1 is equal to 0; when the X2 is greater than 0, the X2 signaling(s) in the X1 signaling(s) respectively corresponds(correspond) to the X2 measured value(s), and the Y1 candidate resource set(s) is(are) all candidate resource set(s) determined by the X2 signaling(s) in the Y0 candidate resource set(s).

In one subembodiment of the above embodiment, the X2 measured value(s) is(are) all measured value(s) less than the corresponding target parameter(s) in the X1 measured value(s).

In one subembodiment of the above embodiment, the X2 measured value(s) is(are) all measured value(s) not greater than the corresponding target parameter(s) in the X1 measured value(s).

In one subembodiment of the above embodiment, a given measured value is one of the X1 measured value(s), and a given target parameter is one of the X1 target parameter(s) corresponding to the given measured value; when the given measured value is less than the given target parameter, the given measured value is one of the X2 measured value(s).

In one subembodiment of the above embodiment, a given measured value is one of the X1 measured value(s), and a given target parameter is one of the X1 target parameter(s) corresponding to the given measured value; when the given measured value is greater than the given target parameter, the given measured value is a measured value other than the X2 measured value(s).

In one subembodiment of the above embodiment, a given measured value is one of the X1 measured value(s), and a given target parameter is one of the X1 target parameter(s) corresponding to the given measured value; when the given measured value is equal to the given target parameter, the given measured value is one of the X2 measured value(s).

In one subembodiment of the above embodiment, a given measured value is one of the X1 measured value(s), and a given target parameter is one of the X1 target parameter(s) corresponding to the given measured value; when the given measured value is equal to the given target parameter, the given measured value is a measured value other than the X2 measured value(s).

Embodiment 7

Figure 7:
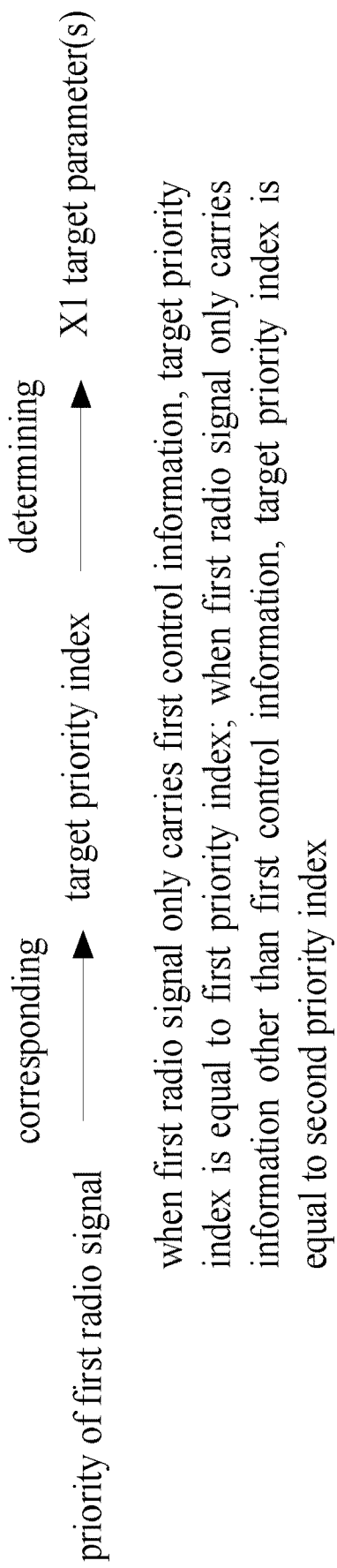
FIG. 7 illustrates a schematic diagram for determining X1 target parameter(s) according to one embodiment of the present disclosure.

Embodiment 7 illustrates a schematic diagram for determining X1 target parameter(s) according to one embodiment of the present disclosure, as shown in FIG. 7.

In embodiment 7, a priority of the first radio signal in the present disclosure corresponds to a target priority index, which is used to determine the X1 target parameter(s); when the first radio signal only carries the first control information in the present disclosure, the target priority index is equal to a first priority index; when the first radio signal only carries information other than the first control information, the target priority index is equal to a second priority index.

In one embodiment, the information other than the first control information comprises a Transport Block (TB).

In one embodiment, the information other than the first control information comprises data.

In one embodiment, the information other than the first control information does not comprise the first control information.

In one embodiment, the target priority index is used to identify the priority of the first radio signal.

In one embodiment, the priority of the first radio signal comprises a level of a Quality of Service (QoS) of the first radio signal.

In one embodiment, the target priority index is a value of ProSe Per-Packet Priority (PPPP).

In one embodiment, the target priority index is a value of ProSe Per-Packet Reliability (PPPR).

In one embodiment, the target priority index is an index of a QoS level.

In one embodiment, the target priority index is an index of a 5G QoS Indicator (5QI).

In one embodiment, the target priority index is an index of a PC5 QoS Indicator (PQI).

In one embodiment, the target priority index is an integer.

In one embodiment, the target priority index is a non-negative integer.

In one embodiment, the target priority index is a positive integer.

In one embodiment, the larger the target priority index is, the higher the priority of the first radio signal will be.

In one embodiment, the smaller the target priority index is, the higher the priority of the first radio signal will be.

In one embodiment, the given target parameter is any of the X1 target parameter(s), and the given target parameter increases with the increase of the target priority index.

In one embodiment, the given target parameter is any of the X1 target parameter(s), and the given target parameter increases with the decrease of the target priority index.

In one embodiment, the given target parameter is any of the X1 target parameter(s), and the given target parameter is one of the Q parameters. The target priority index is used to determine the given target parameter from the Q parameters, Q being a positive integer greater than 1.

In one subembodiment of the above embodiment, the target priority index is used to determine an index of the given target parameter in the Q parameters.

In one subembodiment of the above embodiment, an index of the given target parameter in the Q parameters is linearly related to the target priority index.

In one subembodiment, the given target parameter is any of the X1 target parameter(s). The given target parameter is related to a given candidate parameter, and the given candidate parameter is one of the Q parameters. The target priority index is used to determine the given candidate parameter from the Q parameters, Q being a positive integer greater than 1.

In one subembodiment of the above embodiment, the target priority index is used to determine an index of the given candidate parameter in the Q parameters.

In one subembodiment of the above embodiment, an index of the given candidate parameter in the Q parameters is linearly related to the target priority index.

In one subembodiment of the above embodiment, the given target parameter is equal to the given candidate parameter.

In one subembodiment of the above embodiment, the given target parameter is linearly related to the given candidate parameter.

In one subembodiment of the above embodiment, the given target parameter is linearly related to the given candidate parameter, and a coefficient of the linear correlation between the given target parameter and the given candidate parameter is a positive integral multiple of 3 dB.

In one embodiment, the given target parameter is any of the X1 target parameter(s), and the given signaling is a signaling corresponding to the given target parameter in the X1 signaling(s); the given signaling indicates a given priority index; the given priority index and the target priority index jointly determine the given target parameter.

In one embodiment, the given target parameter is any of the X1 target parameter(s), and the given signaling is a signaling corresponding to the given target parameter in the X1 signaling(s); the given signaling indicates a given priority index; the given target parameter is one of Q parameters. The given priority index and the target priority index are jointly used to determine the given target parameter from the Q parameters, Q being a positive integer greater than 1.

In one subembodiment of the above embodiment, the given priority index and the target priority index is used to determine an index of the given target parameter in the Q parameters.

In one subembodiment of the above embodiment, an index of the given target parameter in the Q parameters is respectively linearly related to the given priority index and the target priority index.

In one subembodiment of the above embodiment, the given priority index is a value of a ProSe Per-Packet Priority (PPPP).

In one subembodiment of the above embodiment, the given priority index is a value of a ProSe Per-Packet Reliability (PPPR).

In one subembodiment of the above embodiment, the given priority index is an index of a QoS level.

In one subembodiment of the above embodiment, the given priority index is an index of a 5G QoS Indicator (5QI).

In one subembodiment of the above embodiment, the given priority index is an index of a PC5 QoS Indicator (PQI).

In one subembodiment of the above embodiment, the given priority index is an integer.

In one subembodiment of the above embodiment, the given priority index is a non-negative integer.

In one subembodiment of the above embodiment, the given priority index is a positive integer.

In one embodiment, the given target parameter is any of the X1 target parameter(s), and the given signaling is a signaling corresponding to the given target parameter in the X1 signaling(s); the given signaling indicates a given priority index; the given target parameter is related to a given candidate parameter, which is one of Q parameters; the given priority index and the target priority index are jointly used to determine the given candidate parameter from the Q parameters, Q being a positive integer greater than 1.

In one subembodiment of the above embodiment, the given target parameter is equal to the given candidate parameter.

In one subembodiment of the above embodiment, the given target parameter is linearly related to the given candidate parameter.

In one subembodiment of the above embodiment, the given target parameter is linearly related to the given candidate parameter, and the coefficient of the linear correlation between the given target parameter and the given candidate parameter is a positive integral multiple of 3 dB.

In one subembodiment of the above embodiment, the given priority index and the target priority index are used to determine an index of the given candidate parameter in the Q parameters.

In one subembodiment of the above embodiment, an index of the given candidate parameter in the Q parameters is respectively linearly related to the given priority index and the target priority index.

In one subembodiment of the above embodiment, the given priority index is a value of a ProSe Per-Packet Priority (PPPP).

In one subembodiment of the above embodiment, the given priority index is a value of a ProSe Per-Packet Reliability (PPPR).

In one subembodiment of the above embodiment, the given priority index is an index of a QoS level.

In one subembodiment of the above embodiment, the given priority index is an index of a 5G QoS Indicator (5QI).

In one subembodiment of the above embodiment, the given priority index is an index of a PC5 QoS Indicator (PQI).

In one subembodiment of the above embodiment, the given priority index is an integer.

In one subembodiment of the above embodiment, the given priority index is a non-negative integer.

In one subembodiment of the above embodiment, the given priority index is a positive integer.

Embodiment 8

Embodiment 8 illustrates a schematic diagram of determining a target priority index according to one embodiment of the present disclosure, as shown in FIG. 8.

In Embodiment 8, when the first radio signal in the present disclosure only carries the first control information in the present disclosure, the target priority index is equal to a first priority index; when the first radio signal only carries information other than the first control information, the target priority index is equal to a second priority index.

In one embodiment, the second signaling is used to indicate the first priority index.

In one subembodiment of the above embodiment, the second signaling directly indicates the first priority index.

In one subembodiment of the above embodiment, the second signaling indirectly indicates the first priority index.

In one subembodiment of the above embodiment, the second signaling explicitly indicates the first priority index.

In one subembodiment of the above embodiment, the second signaling implicitly indicates the first priority index.

In one embodiment, the first signaling is used to indicate the first priority index.

In one subembodiment of the above embodiment, the first signaling directly indicates the first priority index.

In one subembodiment of the above embodiment, the first signaling indirectly indicates the first priority index.

In one subembodiment of the above embodiment, the first signaling explicitly indicates the first priority index.

In one subembodiment of the above embodiment, the first signaling implicitly indicates the first priority index.

In one embodiment, the first signaling is used to indicate the second priority index.

In one subembodiment of the above embodiment, the first signaling directly indicates the second priority index.

In one subembodiment of the above embodiment, the first signaling indirectly indicates the second priority index.

In one subembodiment of the above embodiment, the first signaling explicitly indicates the second priority index.

In one subembodiment of the above embodiment, the first signaling implicitly indicates the second priority index.

In one embodiment, the first priority index is a PPPP value, and the second priority index is a PPPP value.

In one embodiment, the first priority index is a PPPR value, and the second priority index is a PPPR value.

In one embodiment, the first priority index is an index of QoS level, and the second priority index is an index of QoS level.

In one embodiment, the first priority index is an index of a 5QI, and the second priority index is an index of a 5QI.

In one embodiment, the first priority index is an index of a PQI, and the second priority index is an index of a PQI.

In one embodiment, the first priority index is an integer, and the second priority index is an integer.

In one embodiment, the first priority index is a non-negative integer, and the second priority index is a non-negative integer.

In one embodiment, the first priority index is a positive integer, and the second priority index is a positive integer.

Embodiment 9

Embodiment 9 illustrates a schematic diagram of determining a target priority index according to another embodiment of the present disclosure, as shown in FIG. 9.

In Embodiment 9, when the first radio signal in the present disclosure carries the first control information and information other than the first control information in the present disclosure, the target priority index is equal to the second priority index in the present disclosure, or the target priority index is equal to a smaller one between the first priority index and the second priority index in the present disclosure, or, the target priority index is equal to a greater one between the first priority index and the second priority index.

In one embodiment, when the first radio signal carries the first control information and information other than the first control information, the target priority index is equal to the second priority index.

In one embodiment, when the first radio signal carries the first control information and information other than the first control information, the target priority index is equal to a smaller one between the first priority index and the second priority index.

In one embodiment, when the first radio signal carries the first control information and information other than the first control information, the target priority index is equal to a greater one between the first priority index and the second priority index.

Embodiment 10

Figure 10:
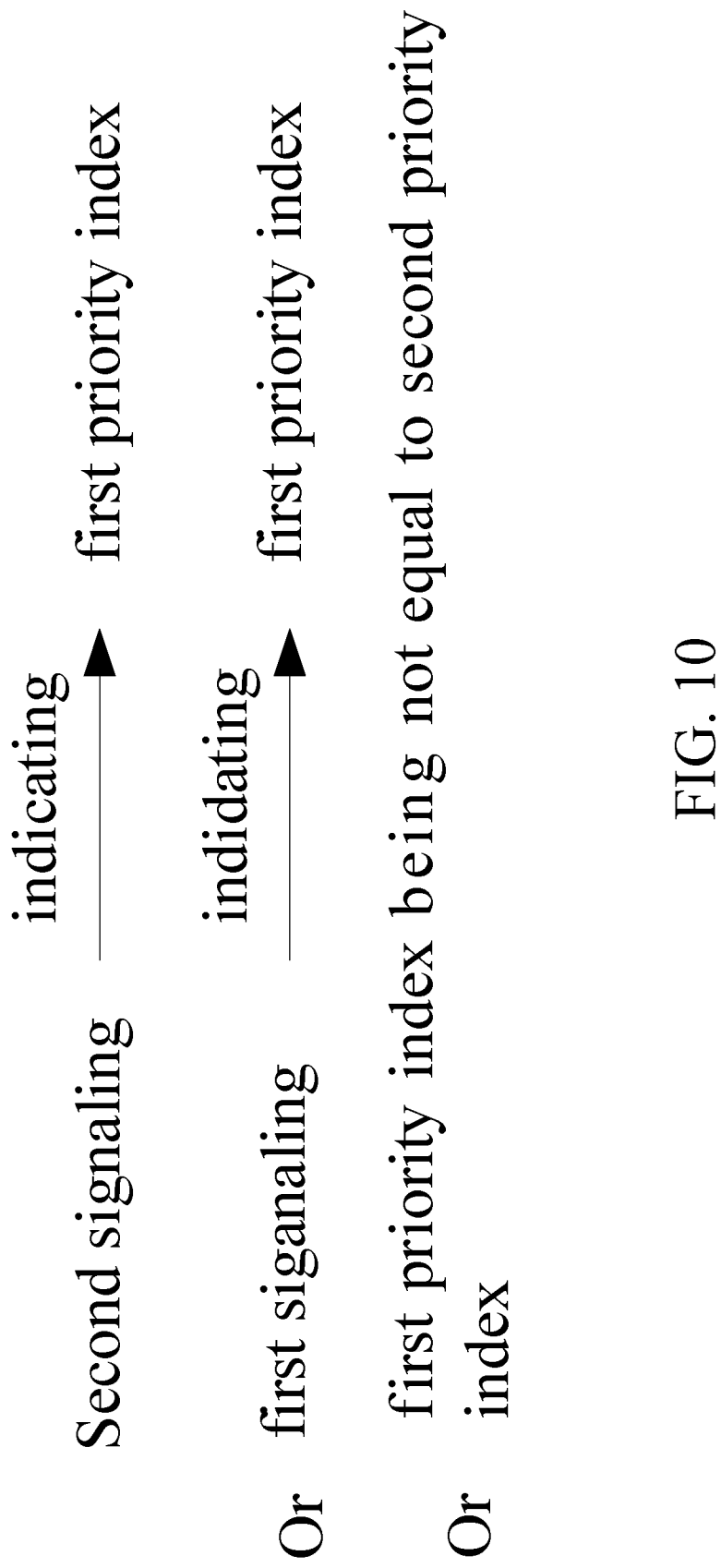
FIG. 10 illustrates a schematic diagram of a first priority index according to the present disclosure.

Embodiment 10 illustrates a schematic diagram of a first priority index according to one embodiment of the present disclosure, as shown in FIG. 10.

In embodiment 10, the first control information in the present disclosure is related to the second radio signal in the present disclosure, the second signaling in the present disclosure is used to determine time-frequency resources occupied by the second radio signal, and the second signaling is used to indicate the first priority index; or, the first signaling in the present disclosure is used to indicate the first priority index; or, the first priority index is not equal to the second priority index in the present disclosure.

In one embodiment, the first control information is related to the second radio signal. The second signaling is used to determine time-frequency resources occupied by the second radio signal, and the second signaling is used to indicate the first priority index;

In one embodiment, the first signaling is used to indicate the first priority index.

In one embodiment, the first priority index is not equal to the second priority index.

In one embodiment, the first priority index is not greater than the second priority index.

In one embodiment, the first priority index is not less than the second priority index.

In one embodiment, the first priority index is predefined.

In one embodiment, the first priority index is pre-configured.

In one embodiment, the first priority index is configurable.

In one embodiment, the above method also comprises: receiving first information;
wherein the first information indicates the first priority index.

In one subembodiment of the above embodiment, the first information is carried by a higher layer signaling.

In one subembodiment of the above embodiment, the first information is carried by an RRC signaling.

In one subembodiment of the above embodiment, the first information is carried by a MAC CE signaling.

In one embodiment, the second priority index is one of X priority indexes, and the first priority index is a minimum value of the X priority indexes, X being a positive integer greater than 1.

In one embodiment, the second priority index is one of X priority indexes, and the first priority index is a maximum value of the X priority indexes, X being a positive integer greater than 1.

In one embodiment, the second priority index is one of X priority indexes, and the first priority index is smaller than any of the X priority indexes, X being a positive integer greater than 1.

In one embodiment, the second priority index is one of X priority indexes, and the first priority index is greater than any of the X priority indexes, X being a positive integer greater than 1.

In one embodiment, the second priority index is one of X priority indexes, and the first priority index is not equal to any of the X priority indexes, X being a positive integer greater than 1.

In one embodiment, the second priority index is one of X priority indexes, and the first priority index is one of the X priority indexes, X being a positive integer greater than 1.

Embodiment 11

Figure 11:
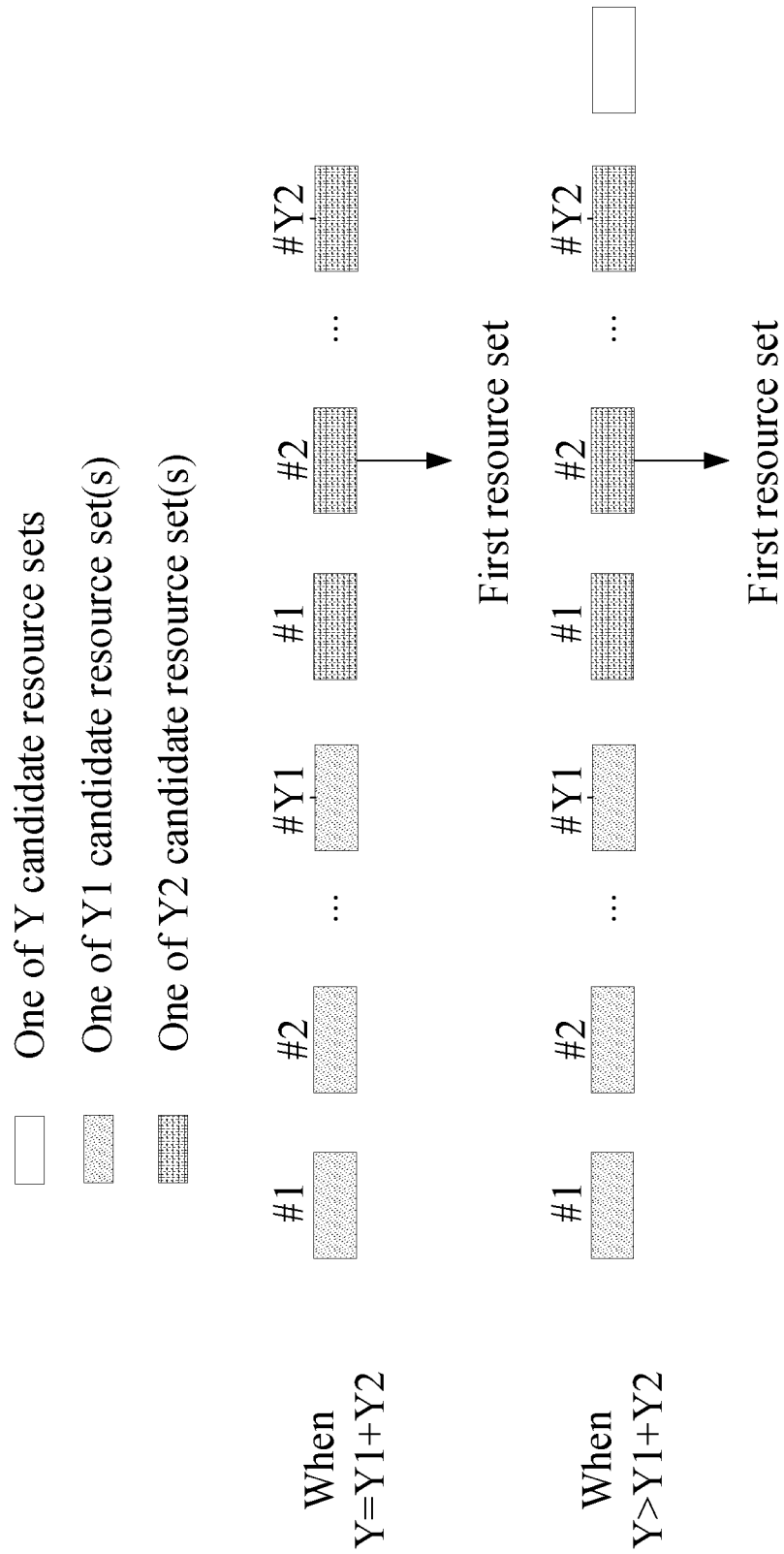
FIG. 11 illustrates a schematic diagram of determining a first resource set according to the present disclosure.

Embodiment 11 illustrates a schematic diagram for determining a first resource set according to one embodiment of the present disclosure, as shown in FIG. 11.

In Embodiment 11, the first candidate resource pool in the present disclosure comprises Y candidate resource sets; when the Y1 in the present disclosure is greater than 0, any of the Y1 candidate resource set(s) in the present disclosure is one of the Y candidate resource sets; the first resource set is a candidate resource set of Y2 candidate resource set(s), and any of the Y2 candidate resource set(s) is a candidate resource set of the Y candidate resource sets other than the Y1 candidate resource set(s); Y2 is a positive integer, and Y is a positive integer not less than a sum of the Y1 and the Y2; a ratio of the Y2 to the Y is not less than a first threshold.

In one embodiment, the Y2 is a minimum positive integer of which a ratio to the Y is not less than a first threshold.

In one embodiment, the Y2 is a minimum positive integer of which a ratio to the Y is greater than a first threshold.

In one embodiment, a ratio of the Y2 to the Y is equal to a first threshold.

In one embodiment, a ratio of the Y2 to the Y is greater than a first threshold.

In one embodiment, a ratio of the Y2 to the Y is not less than a first threshold, and a ratio of Y2-1 to the Y is less than the first threshold.

In one embodiment, a first threshold is a positive real number greater than 0 and less than 1.

In one embodiment, a first threshold is 20%.

In one embodiment, the Y is equal to a sum of the Y1 and the Y2.

In one embodiment, the Y is greater than a sum of the Y1 and the Y2.

In one embodiment, Y3 candidate resource set(s) is(are) all candidate resource set(s) among the Y candidate resource sets other than the Y1 candidate resource set(s), and the Y3 candidate resource set(s) corresponds(correspond) to Y3 measured value(s) respectively. The Y2 candidate resource set(s) is(are) Y2 candidate resource set(s) with lowest measured value(s) corresponding to the Y3 candidate resource set(s); Y3 is a positive integer not less than the Y2 and not greater than the Y.

In one subembodiment of the above embodiment, the Y3 measured value(s) is(are) measured by milliwatt.

In one subembodiment of the above embodiment, the Y3 measured value(s) is(are) measured by dBm.

In one subembodiment of the above embodiment, the Y3 measured value(s) is(are) respectively Y3 RSSI(s).

In one subembodiment of the above embodiment, the Y3 measured value(s) is(are) respectively Y3 RSRP(s).

In one subembodiment of the above embodiment, the Y3 measured value(s) is(are) respectively Y3 RSRQ(s).

In one subembodiment of the above embodiment, the Y3 measured value(s) is(are) respectively Y3 average power(s).

In one subembodiment of the above embodiment, the Y3 measured value(s) is(are) respectively Y3 average energy (energies).

In one embodiment, the selection of the first resource set from the Y2 candidate resource set(s) by the first communication node is related to the implementation of the second communication node.

In one embodiment, the first communication node voluntarily selects the first resource set from the Y2 candidate resource set(s).

In one embodiment, the first communication node randomly selects the first resource set from the Y2 candidate resource set(s).

Embodiment 12

Figure 12:
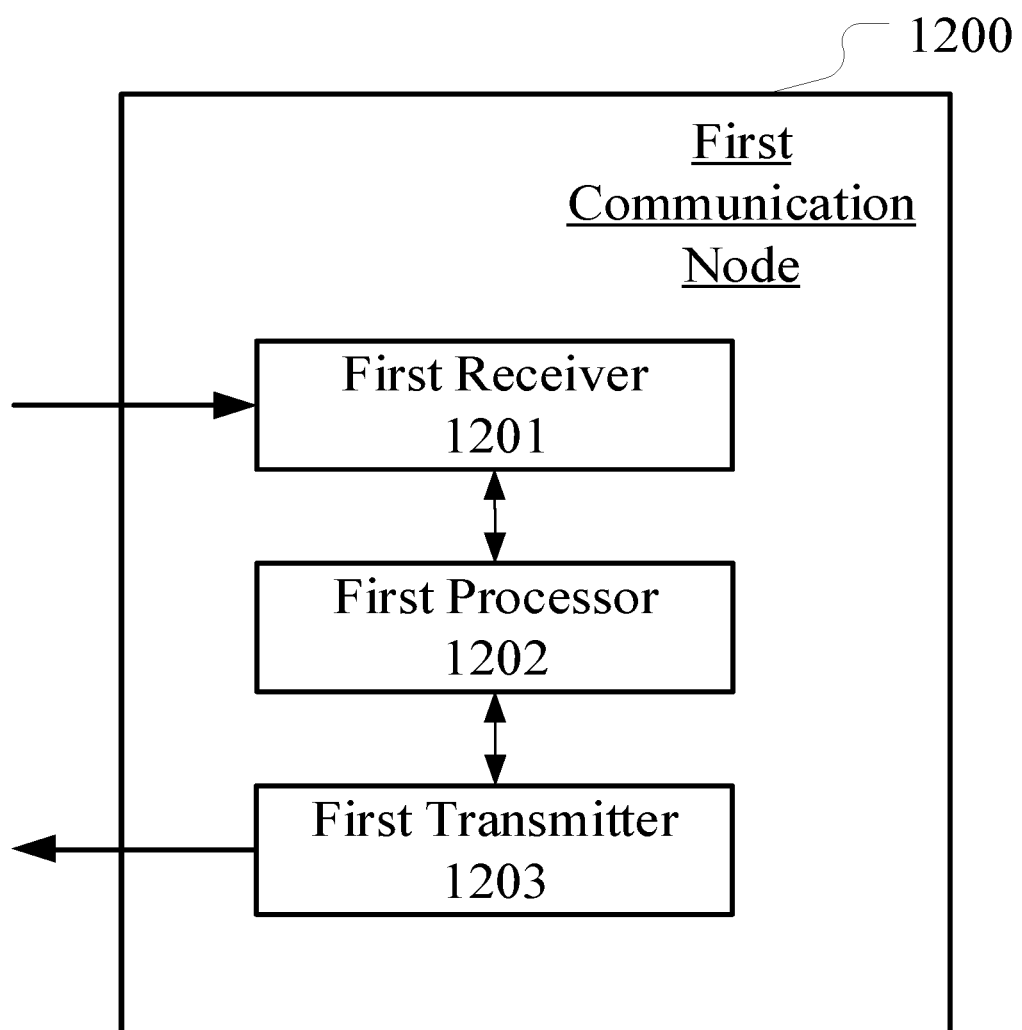
FIG. 12 illustrates a structure block diagram of a processing device of a first communication node according to one embodiment of the present disclosure.

Embodiment 12 illustrates a structural block diagram of a processing apparatus in a first communication node, as shown in FIG. 12. In FIG. 12, a first communication node processing apparatus 1200 comprises a first receiver 1201, a first processor 1202 and a first transmitter 1203.

In one embodiment, the first receiver 1201 comprises at least one of the antenna 452, the receiver 454, the multi-antenna receiving processor 458, the receiving processor 456, the controller/processor 459, the memory 460, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460, the memory 460 or the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460, the memory 460 or the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460, the memory 460 or the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460, the memory 460 or the data source 467 in FIG. 4 of the present disclosure.

In one embodiment, the first processor 1202 comprises the controller/processor 459 in FIG. 4 of the present disclosure.

In one embodiment, the first processor 1202 comprises at least one of the multi-antenna receiving processor 458, the receiving processor 456 or the controller/processor 459 in FIG. 4 of the present disclosure.

In one embodiment, the first processor 1202 comprises at least the first three of the multi-antenna receiving processor 458, the receiving processor 456, the controller/processor 459, the antenna 452, the receiver 454, the memory 460 or the data source 467 in FIG. 4 of the present disclosure.

In one embodiment, the first transmitter 1203 comprises at least one of the antenna 452, the transmitter 454, the multi-antenna transmitter processor 457, the transmitting processor 468, the controller/processor 459, the memory 460, or the data source 467 in FIG. 4 of the present disclosure.

In one embodiment, the first transmitter 1203 comprises at least the first five of the antenna 452, the transmitter 454, the multi-antenna transmitter processor 457, the transmitting processor 468, the controller/processor 459, the memory 460, or the data source 467 in FIG. 4 of the present disclosure.

In one embodiment, the first transmitter 1203 comprises at least the first four of the antenna 452, the transmitter 454, the multi-antenna transmitter processor 457, the transmitting processor 468, the controller/processor 459, the memory 460, or the data source 467 in FIG. 4 of the present disclosure.

In one embodiment, the first transmitter 1203 comprises at least the first three of the antenna 452, the transmitter 454, the multi-antenna transmitter processor 457, the transmitting processor 468, the controller/processor 459, the memory 460, or the data source 467 in FIG. 4 of the present disclosure.

In one embodiment, the first transmitter 1203 comprises at least the first two of the antenna 452, the transmitter 454, the multi-antenna transmitter processor 457, the transmitting processor 468, the controller/processor 459, the memory 460, or the data source 467 in FIG. 4 of the present disclosure.

A first receiver 1201 performs signaling monitoring in a first time window, X1 signaling(s) being detected in the signaling monitoring process, and X1 being a non-negative integer;

a first processor 1202 determines a first resource set from a first candidate resource pool;

a first transmitter 1203 transmits a first signaling; and transmits a first radio signal in the first resource set;

In Embodiment 12, the X1 signaling(s) and X1 target parameter(s) are used to determine Y1 candidate resource set(s) from the first candidate resource pool, Y1 being a non-negative integer; the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling; whether the first radio signal carries first control information is used to determine the X1 target parameter(s).

In one embodiment, a first receiver 1201 also receives a second signaling; and receives a second radio signal; wherein the second signaling is used to determine time-frequency resources occupied by the second radio signal, and the first control information is related to the second radio signal.

In one embodiment, the X1 is greater than 0, the X1 signaling(s) respectively correspond to X1 measured value(s), the X1 signaling(s) is(are) used to determine Y0 candidate resource set(s) from the first candidate resource pool, Y0 being a non-negative integer not less than the Y1; when the Y0 is greater than 0, the X1 measured value(s) respectively corresponds(correspond) to the X1 target parameter(s), and relative magnitude of each of the X1 measured value(s) and the corresponding target parameter in the X1 target parameter(s) is used to determine the Y1 candidate resource set(s) from the Y0 candidate resource set(s); when the Y1 is greater than 0, any of the Y1 candidate resource set(s) is one of the Y0 candidate resource set(s).

In one embodiment, a priority of the first radio signal corresponds to a target priority index, which is used to determine the X1 target parameter(s); when the first radio signal only carries the first control information, and the target priority index is equal to a first priority index; when the first radio signal only carries information other than the first control information, the target priority index is equal to a second priority index.

In one embodiment, when the first radio signal carries the first control information and information other than the first control information, the target priority index is equal to the second priority index, or the target priority index is equal to a smaller one between the first priority index and the second priority index, or, the target priority index is equal to a greater one between the first priority index and the second priority index.

In one embodiment, the first control information is related to the second radio signal. The second signaling is used to determine time-frequency resources occupied by the second radio signal, and the second signaling is used to indicate the first priority index; or, the first signaling is used to indicate the first priority index; or, the first priority index is not equal to the second priority index.

In one embodiment, the first candidate resource pool comprises Y candidate resource sets; when the Y1 is greater than 0, any candidate resource set of the Y1 candidate resource set(s) is a candidate resource set of the Y candidate resource sets; the first resource set is one of Y2 candidate resource sets, and any of the Y2 candidate resource sets is a candidate resource set of the Y candidate resource sets other than the Y1 candidate resource set(s); Y2 is a positive integer, and Y is a positive integer not less than a sum of the Y1 and the Y2; a ratio of the Y2 to the Y is not less than a first threshold.

Embodiment 13

Figure 13:
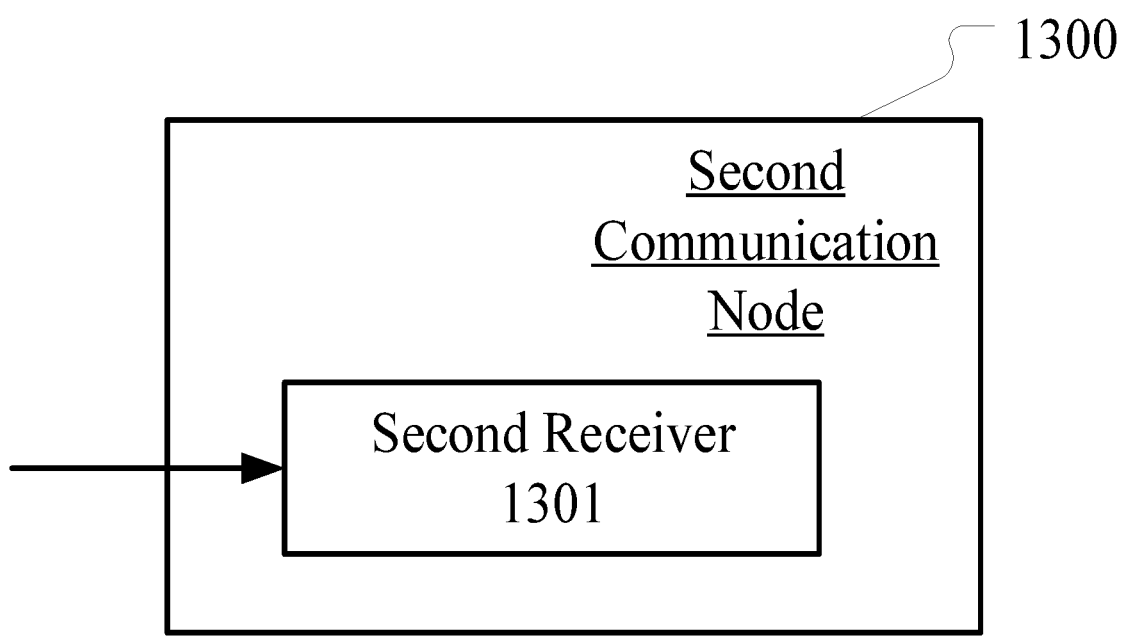
FIG. 13 illustrates a structure block diagram of a processing device of a second communication node according to one embodiment of the present disclosure.

Embodiment 13 illustrates a structural block diagram of a processing device in a second communication node, as shown in FIG. 13. In FIG. 13, the second communication node processing apparatus 1300 comprises a second receiver 1301.

In one embodiment, the second receiver 1301 comprises at least one of the antennas 420, the receiver 418, the multi-antenna receiving processor 472, the receiving processor 470, the controller/processor 475 or the memory 476 in FIG. 4 of the present disclosure.

In one embodiment, the second receiver 1301 comprises at least the first five of the antennas 420, the receiver 418, the multi-antenna receiving processor 472, the receiving processor 470, the controller/processor 475 or the memory 476 in FIG. 4 of the present disclosure.

In one embodiment, the second receiver 1301 comprises at least the first four of the antennas 420, the receiver 418, the multi-antenna receiving processor 472, the receiving processor 470, the controller/processor 475 or the memory 476 in FIG. 4 of the present disclosure.

In one embodiment, the second receiver 1301 comprises at least the first three of the antennas 420, the receiver 418, the multi-antenna receiving processor 472, the receiving processor 470, the controller/processor 475 or the memory 476 in FIG. 4 of the present disclosure.

In one embodiment, the second receiver 1301 comprises at least the first two of the antennas 420, the receiver 418, the multi-antenna receiving processor 472, the receiving processor 470, the controller/processor 475 or the memory 476 in FIG. 4 of the present disclosure.

In one embodiment, the second receiver 1301 comprises at least the first of the antennas 420, the receiver 418, the multi-antenna receiving processor 472, the receiving processor 470, the controller/processor 475 or the memory 476 in FIG. 4 of the present disclosure.

The second receiver 1301 performs signaling monitoring in a first candidate resource pool; receives a first signaling; and receives a first radio signal in the first resource set;

In Embodiment 13, X1 target parameter(s) is(are) used by a communication node transmitting the first signaling to determine Y1 candidate resource set(s) from the first candidate resource pool, X1 being a non-negative integer and Y1 being a non-negative integer; the first resource set is a candidate resource set in the first candidate resource pool other than the Y1 candidate resource set(s); the first signaling is used to determine time-frequency resources occupied by the first radio signal; whether the first radio signal carries first control information is used by the communication node transmitting the first signaling to determine the X1 target parameter(s).

In one embodiment, the second communication node further comprises:

a second transmitter 1302, transmitting a second signaling; and transmitting a second radio signal;

herein the second signaling is used to determine time-frequency resources occupied by the second radio signal, and the first control information is related to the second radio signal.

In one subembodiment of the embodiment, the second transmitter 1302 comprises at least one of the antenna 420, the transmitter 418, the multi-antenna transmitting processor 471, the transmitting processor 416, the controller/processor 475 or the memory 476 in FIG. 4 of the present disclosure.

In one subembodiment of the embodiment, the second transmitter 1302 comprises at least the first five of the antenna 420, the transmitter 418, the multi-antenna transmitting processor 471, the transmitting processor 416, the controller/processor 475 and the memory 476 in FIG. 4 of the present disclosure.

In one subembodiment of the embodiment, the second transmitter 1302 comprises at least the first four of the antenna 420, the transmitter 418, the multi-antenna transmitting processor 471, the transmitting processor 416, the controller/processor 475 and the memory 476 in FIG. 4 of the present disclosure.

In one subembodiment of the embodiment, the second transmitter 1302 comprises at least the first three of the antenna 420, the transmitter 418, the multi-antenna transmitting processor 471, the transmitting processor 416, the controller/processor 475 and the memory 476 in FIG. 4 of the present disclosure.

In one subembodiment of the embodiment, the second transmitter 1302 comprises at least the first two of the antenna 420, the transmitter 418, the multi-antenna transmitting processor 471, the transmitting processor 416, the controller/processor 475 and the memory 476 in FIG. 4 of the present disclosure.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. A first communication node or a second communication node or a UE or a terminal in the present disclosure comprises but is not limited to mobile phones, tablet computers, laptops, network cards, low-power equipment, eMTC equipment, NB-IOT equipment, vehicular communication device, aerobat, aircraft, UAV, remote control aircraft and other wireless communication equipment. A second communication node or a base station or network side device in the present disclosure comprises but is not limited to the macro-cellular base station, micro-cellular base station, home base station, relay base station, eNB, gNB, transmitting and receiving node TRP, relay satellite, satellite base station, air base station and other wireless communication equipment. The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first communication node for wireless communication, comprising:
a first receiver, performing signaling monitoring in a first time window, wherein X1 signaling(s) being detected in the signaling monitoring process, and X1 being a non-negative integer;
a first processor, determining a first resource set from a first candidate resource pool; and
a first transmitter, transmitting a first signaling; and transmitting a first radio signal in the first resource set;
wherein the X1 signaling(s) and X1 target parameter(s) are used to determine Y1 candidate resource set(s) from the first candidate resource pool, Y1 being a non-negative integer; the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling; whether the first radio signal carries first control information is used to determine the X1 target parameter(s);
a priority of the first radio signal corresponds to a target priority index, and the target priority index is used to determine the X1 target parameter(s); when the first radio signal only carries the first control information, the target priority index is equal to a first priority index; when the first radio signal only carries information other than the first control information, the target priority index is equal to a second priority index; the second priority index is one of X priority indexes, and the first priority index is a minimum value of the X priority indexes, X being a positive integer greater than 1; the first control information comprises CSI (Channel State Information); the information other than the first control information comprises data; any of the X1 signaling(s) is transmitted through a Sidelink, the first signaling is transmitted through a Sidelink, and the first radio signal is transmitted through a Sidelink; time-domain resources occupied by the first signaling are used to determine time-domain resources occupied by the first radio signal, and frequency-domain resources occupied by the first signaling are used to determine frequency-domain resources occupied by the first radio signal; and
wherein a given target parameter is any of the X1 target parameter(s), and a given signaling is a signaling corresponding to the given target parameter in the X1 signaling(s); the given signaling indicates a given priority index; the given target parameter is one of Q parameters; the given priority index and the target priority index are jointly used to determine the given target parameter from the Q parameters, Q being a positive integer greater than 1.

2. The first communication node according to claim 1, wherein the first receiver also receives a second signaling; and receives a second radio signal; wherein the second signaling is used to determine time-frequency resources occupied by the second radio signal, and the first control information is related to the second radio signal; the second signaling is transmitted through Sidelink; the second radio signal comprises at least one of a SideLink Channel State Information-Reference Signal (SL CSI-RS) or SideLink CSI-interference measurement resource (SL CSI-IMR); time-domain resources occupied by the second signaling are used to determine time-domain resources occupied by the second radio signal.

3. The first communication node according to claim 1, wherein the X1 is greater than 0, and the X1 signaling(s) respectively correspond(s) to X1 measured value(s), the X1 measured value(s) is(are) respectively X1 RSRP(s); the X1 signaling(s) is(are) used to determine Y0 candidate resource set(s) from the first candidate resource pool, and Y0 is a non-negative integer not less than the Y1; when the Y0 is greater than 0, the X1 measured value(s) respectively correspond(s) to the X1 target parameter(s), and relative magnitude of each of the X1 measured value(s) and the corresponding target parameter in the X1 target parameter(s) is used to determine the Y1 candidate resource set(s) from the Y0 candidate resource set(s); when the Y1 is greater than 0, any of the Y1 candidate resource set(s) is one of the Y0 candidate resource set(s);

when the Y0 is greater than 0, X2 measured value(s) comprise(s) all measured value(s) greater than the corresponding target parameter(s) in the X1 measured value(s), X2 being a non-negative integer not greater than the X1; when the X2 is equal to 0, the Y1 is equal to 0; when the X2 is greater than 0, X2 signaling(s) in the X1 signaling(s) respectively corresponds(correspond) to the X2 measured value(s), and the Y1 candidate resource set(s) is(are) all candidate resource set(s) determined by the X2 signaling(s) in the Y0 candidate resource set(s).

4. The first communication node according to claim 1, wherein the first priority index is not greater than the second priority index; the target priority index is a positive integer; the smaller the target priority index is, the higher the priority of the first radio signal will be.

5. The first communication node according to claim 1, wherein when the first radio signal carries the first control information and the information other than the first control information, the target priority index is equal to a smaller one between the first priority index and the second priority index.

6. The first communication node according to claim 1, wherein when the first radio signal only carries the first control information, the target priority index is equal to a first priority index, and the first signaling is used to indicate the first priority index; when the first radio signal only carries information other than the first control information, the target priority index is equal to a second priority index, and the first signaling is used to indicate the second priority index.

7. The first communication node according to claim 1, wherein the first candidate resource pool comprises Y candidate resource sets; when the Y1 is greater than 0, any of the Y1 candidate resource set(s) is a candidate resource set of the Y candidate resource sets; the first resource set is a candidate resource set of Y2 candidate resource set(s), and any of the Y2 candidate resource sets is a candidate resource set among the Y candidate resource sets other than the Y1 candidate resource set(s); Y2 is a positive integer, and Y is a positive integer not less than a sum of the Y1 and the Y2; a ratio of the Y2 to the Y is not less than a first threshold, and the first threshold is a positive real number greater than 0 and less than 1.

8. A second communication node for wireless communication, comprising:
a second receiver, performing signaling monitoring in a first candidate resource pool;
receiving a first signaling; and receiving a first radio signal in a first resource set;
wherein X1 target parameter(s) is(are) used by a communication node transmitting the first signaling to determine Y1 candidate resource set(s) from the first candidate resource pool, X1 being a non-negative integer and Y1 being a non-negative integer; the first resource set is a candidate resource set in the first candidate resource pool other than the Y1 candidate resource set(s); the first signaling is used to determine time-frequency resources occupied by the first radio signal; whether the first radio signal carries first control information is used by the communication node transmitting the first signaling to determine the X1 target parameter(s);
a priority of the first radio signal corresponds to a target priority index, and the target priority index is used to determine the X1 target parameter(s); when the first radio signal only carries the first control information, the target priority index is equal to a first priority index; when the first radio signal only carries information other than the first control information, the target priority index is equal to a second priority index; the second priority index is one of X priority indexes, and the first priority index is a minimum value of the X priority indexes, X being a positive integer greater than 1; the first control information comprises CSI (Channel State Information); the information other than the first control information comprises data; any of the X1 signaling(s) is transmitted through a Sidelink, the first signaling is transmitted through a Sidelink, and the first radio signal is transmitted through a Sidelink; time-domain resources occupied by the first signaling are used to determine time-domain resources occupied by the first radio signal, and frequency-domain resources occupied by the first signaling are used to determine frequency-domain resources occupied by the first radio signal; and
wherein a given target parameter is any of the X1 target parameter(s), and a given signaling is a signaling corresponding to the given target parameter in the X1 signaling(s); the given signaling indicates a given priority index; the given target parameter is one of Q parameters; the given priority index and the target priority index are jointly used to determine the given target parameter from the Q parameters, Q being a positive integer greater than 1.

9. The second communication node according to claim 8, comprising:
a second transmitter, transmitting a second signaling; and transmitting a second radio signal;
wherein the second signaling is used to determine time-frequency resources occupied by the second radio signal, and the first control information is related to the second radio signal; the second signaling is transmitted through Sidelink; the second radio signal comprises at least one of a SideLink Channel State Information-Reference Signal (SL CSI-RS) or SideLink CSI-interference measurement resource (SL CSI-IMR); time-domain resources occupied by the second signaling are used to determine time-domain resources occupied by the second radio signal.

10. A method used in a first communication node for wireless communication, comprising:
performing signaling monitoring in a first time window, wherein X1 signaling(s) being detected in the signaling monitoring process, and X1 being a non-negative integer;
determining a first resource set from a first candidate resource pool;
transmitting a first signaling; and
transmitting a first radio signal in the first resource set;

wherein the X1 signaling(s) and X1 target parameter(s) are used to determine Y1 candidate resource set(s) from the first candidate resource pool, Y1 being a non-negative integer;

the first resource set is a candidate resource set in the first candidate resource pool other than the Y1 candidate resource set(s); the first signaling is used to determine time-frequency resources occupied by the first radio signal; an end time of the first time window is not later than a start time for transmission of the first signaling; whether the first radio signal carries first control information is used to determine the X1 target parameter(s);

a priority of the first radio signal corresponds to a target priority index, and the target priority index is used to determine the X1 target parameter(s); in response to the first radio signal only carrying the first control information, the target priority index is equal to a first priority index; in response to the first radio signal only carrying information other than the first control information, the target priority index is equal to a second priority index; the second priority index is one of X priority indexes, and the first priority index is a minimum value of the X priority indexes, X being a positive integer greater than 1; the first control information comprises CSI (Channel State Information); the information other than the first control information comprises data; any of the X1 signaling(s) is transmitted through a Sidelink, the first signaling is transmitted through a Sidelink, and the first radio signal is transmitted through a Sidelink; time-domain resources occupied by the first signaling are used to determine time-domain resources occupied by the first radio signal, and frequency-domain resources occupied by the first signaling are used to determine frequency-domain resources occupied by the first radio signal; and wherein a given target parameter is any of the X1 target parameter(s), and a given signaling is a signaling corresponding to the given target parameter in the X1 signaling(s); the given signaling indicates a given priority index; the given target parameter is one of Q parameters; the given priority index and the target priority index are jointly used to determine the given target parameter from the Q parameters, Q being a positive integer greater than 1.

11. The method according to claim 10, comprising:
receiving a second signaling; and
receiving a second radio signal;
wherein the second signaling is used to determine time-frequency resources occupied by the second radio signal, and the first control information is related to the second radio signal; the second signaling is transmitted through Sidelink; the second radio signal comprises at least one of a SideLink Channel State Information-Reference Signal (SL CSI-RS) or SideLink CSI-interference measurement resource (SL CSI-IMR); time-domain resources occupied by the second signaling are used to determine time-domain resources occupied by the second radio signal.

12. The method according to claim 10, wherein the X1 is greater than 0; the X1 signaling(s) respectively corres-pond(s) to X1 measured value(s), the X1 measured value(s) is(are) respectively X1 RSRP(s), and the X1 signaling(s) is(are) used to determine Y0 candidate resource set(s) from the first candidate resource pool, Y0 being a non-negative integer not less than the Y1;

in response to the Y0 being greater than 0, the X1 measured value(s) respectively correspond(s) to the X1 target parameter(s), and relative magnitude of each of the X1 measured value(s) and the corresponding target parameter in the X1 target parameter(s) is used to determine the Y1 candidate resource set(s) from the Y0 candidate resource set(s); in response to the Y1 being greater than 0, any of the Y1 candidate resource set(s) is one of the Y0 candidate resource set(s);

when the Y0 is greater than 0, X2 measured value(s) comprise(s) all measured value(s) greater than the corresponding target parameter(s) in the X1 measured value(s), X2 being a non-negative integer not greater than the X1; when the X2 is equal to 0, the Y1 is equal to 0; when the X2 is greater than 0, X2 signaling(s) in the X1 signaling(s) respectively corresponds(correspond) to the X2 measured value(s), and the Y1 candidate resource set(s) is(are) all candidate resource set(s) determined by the X2 signaling(s) in the Y0 candidate resource set(s).

13. The method according to claim 10, wherein the first priority index is not greater than the second priority index; the target priority index is a positive integer; the smaller the target priority index is, the higher the priority of the first radio signal will be.

14. The method according to claim 10, wherein in response to the first radio signal carrying the first control information and the information other than the first control information, the target priority index is equal to a smaller one between the first priority index and the second priority index.

15. The method according to claim 10, wherein when the first radio signal only carries the first control information, the target priority index is equal to a first priority index, and the first signaling is used to indicate the first priority index; when the first radio signal only carries information other than the first control information, the target priority index is equal to a second priority index, and the first signaling is used to indicate the second priority index.

16. The method according to claim 10, wherein the first candidate resource pool comprises Y candidate resource sets; in response to the Y1 is greater than 0, any of the Y1 candidate resource set(s) is a candidate resource set of the Y candidate resource sets; the first resource set is a candidate resource set of Y2 candidate resource set(s), and any of the Y2 candidate resource sets is a candidate resource set among the Y candidate resource sets other than the Y1 candidate resource set(s); Y2 is a positive integer, and Y is a positive integer not less than a sum of the Y1 and the Y2; a ratio of the Y2 to the Y is not less than a first threshold, and the first threshold is a positive real number greater than 0 and less than 1.

17. A method used in a second communication node for wireless communication, comprising:
performing signaling monitoring in a first candidate resource pool;
receiving a first signaling; and
receiving a first radio signal in a first resource set;
wherein X1 target parameter(s) is(are) used by a communication node transmitting the first signaling to determine Y1 candidate resource set(s) from the first candidate resource pool, X1 being a non-negative integer and Y1 being a non-negative integer; the first resource set is a candidate resource set in the first candidate resource pool other than the Y1 candidate resource set(s); the first signaling is used to determine time-frequency resources occupied by the first radio signal;

whether the first radio signal carries first control information is used by the communication node transmitting the first signaling to determine the X1 target parameter(s);

a priority of the first radio signal corresponds to a target priority index, and the target priority index is used to determine the X1 target parameter(s); in response to the first radio signal only carrying the first control information, the target priority index is equal to a first priority index; in response to the first radio signal only carrying information other than the first control information, the target priority index is equal to a second priority index; the second priority index is one of X priority indexes, and the first priority index is a minimum value of the X priority indexes, X being a positive integer greater than 1; the first control information comprises CSI (Channel State Information); the information other than the first control information comprises data; any of the X1 signaling(s) is transmitted through a Sidelink, the first signaling is transmitted through a Sidelink, and the first radio signal is transmitted through a Sidelink; time-domain resources occupied by the first signaling are used to determine time-domain resources occupied by the first radio signal, and frequency-domain resources occupied by the first signaling are used to determine frequency-domain resources occupied by the first radio signal; and wherein a given target parameter is any of the X1 target parameter(s), and a given signaling is a signaling corresponding to the given target parameter in the X1 signaling(s); the given signaling indicates a given priority index; the given target parameter is one of Q parameters; the given priority index and the target priority index are jointly used to determine the given target parameter from the Q parameters, Q being a positive integer greater than 1.

18. The method according to claim 17, comprising:

transmitting a second signaling; and transmitting a second radio signal;

wherein the second signaling is used to determine time-frequency resources occupied by the second radio signal, and the first control information is related to the second radio signal; the second signaling is transmitted through Sidelink; the second radio signal comprises at least one of a SideLink Channel State Information-Reference Signal (SL CSI-RS) or SideLink CSI-interference measurement resource (SL CSI-IMR); time-domain resources occupied by the second signaling are used to determine time-domain resources occupied by the second radio signal.

* * * * *